United States Patent
Seidemann et al.

(10) Patent No.: US 10,816,742 B2
(45) Date of Patent: Oct. 27, 2020

(54) INTEGRATED CIRCUIT PACKAGES INCLUDING AN OPTICAL REDISTRIBUTION LAYER

(71) Applicant: Intel IP Corporation, Santa Clara, CA (US)

(72) Inventors: Georg Seidemann, Landshut (DE); Christian Geissler, Teugn (DE); Sven Albers, Regensburg (DE); Thomas Wagner, Regensburg (DE); Marc Dittes, Regensburg (DE); Klaus Reingruber, Langquaid (DE); Andreas Wolter, Regensburg (DE); Richard Patten, Langquaid (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/182,450

(22) Filed: Nov. 6, 2018

(65) Prior Publication Data

US 2019/0072732 A1    Mar. 7, 2019

Related U.S. Application Data

(62) Division of application No. 15/089,524, filed on Apr. 2, 2016, now Pat. No. 10,209,466.

(51) Int. Cl.
*G02B 6/42* (2006.01)
*G02B 6/122* (2006.01)
(Continued)

(52) U.S. Cl.
CPC ............ *G02B 6/428* (2013.01); *G02B 6/122* (2013.01); *G02B 6/12002* (2013.01);
(Continued)

(58) Field of Classification Search
CPC .... G02B 6/428; G02B 6/12002; G02B 6/122; G02B 6/1221; G02B 6/132; G02B 6/4238; G02B 6/30
See application file for complete search history.

(56) References Cited

U.S. PATENT DOCUMENTS

| | | | |
|---|---|---|---|
| 7,596,289 B2 * | 9/2009 | Yamamoto | G02B 6/12002 385/14 |
| 8,536,672 B2 | 9/2013 | Chang et al. | |

(Continued)

OTHER PUBLICATIONS

Final Office Action for U.S. Appl. No. 15/089,524, dated Nov. 2, 2017.

(Continued)

*Primary Examiner* — Chris H Chu
(74) *Attorney, Agent, or Firm* — Green, Howard, & Mughal LLP

(57) ABSTRACT

Disclosed is a package comprising a substrate having a patterned surface with an optical contact area, an optical redistribution layer (oRDL) feature, and a build-up material extending over the patterned surface of the substrate and around portions of the oRDL features. In some embodiments, the package comprises a liner sheathing the oRDL features. In some embodiments, the oRDL feature extends through openings in an outer surface of the build-up material and forms posts extending outward from the outer surface. In some embodiments, the package comprises an electrical redistribution layer (eRDL) feature, at least some portion of which overlap at least some portion of the oRDL feature. In some embodiments, the package comprises an optical fiber coupled to the oRDL features.

8 Claims, 14 Drawing Sheets

(51) Int. Cl.
  *G02B 6/132* (2006.01)
  *G02B 6/30* (2006.01)
  *G02B 6/12* (2006.01)
  *G02B 6/43* (2006.01)

(52) U.S. Cl.
  CPC ........... *G02B 6/1221* (2013.01); *G02B 6/132* (2013.01); *G02B 6/30* (2013.01); *G02B 6/4238* (2013.01); *G02B 6/43* (2013.01); *G02B 6/4232* (2013.01); *G02B 2006/12197* (2013.01)

(56) References Cited

U.S. PATENT DOCUMENTS

| | | | |
|---|---|---|---|
| 8,803,316 B2 * | 8/2014 | Lin | H01L 21/76898 257/737 |
| 9,236,328 B1 * | 1/2016 | Leobandung | H01L 21/76898 |
| 9,287,417 B2 | 3/2016 | Suen et al. | |
| 10,267,990 B1 * | 4/2019 | Yu | G02B 6/136 |
| 2002/0039464 A1 | 4/2002 | Yoshimura et al. | |
| 2006/0072871 A1 | 4/2006 | Uchida | |
| 2008/0181557 A1 * | 7/2008 | Wang | G02B 6/12002 385/14 |
| 2009/0016670 A1 | 1/2009 | Shemi et al. | |
| 2009/0243045 A1 | 10/2009 | Pagaila et al. | |
| 2012/0092771 A1 * | 4/2012 | Liu | G02B 5/1857 359/576 |
| 2012/0314992 A1 * | 12/2012 | Lee | G02B 6/428 385/14 |
| 2014/0106507 A1 | 4/2014 | Meyer | |
| 2014/0264400 A1 * | 9/2014 | Lipson | H01L 27/144 257/88 |
| 2015/0205041 A1 * | 7/2015 | Neelakantan | H01L 27/14629 385/14 |
| 2015/0364453 A1 | 12/2015 | Schunk | |

OTHER PUBLICATIONS

International Preliminary Report on Patentability for International Patent Application No. PCT/US17/20278, dated Oct. 11, 2018.
International Search Report and Written Opinion for International Patent Application No. PCT/US2017/020278, dated May 31, 2017.
Office Action for U.S Appl. No. 15/089,524, dated Apr. 20, 2017.
Notice of Allowance for U.S. Appl. No. 15/089,524, dated Oct. 22, 2018.
Office Action for U.S. Appl. No. 15/089,524, notified on Mar. 26, 2018.
Restriction Requirement for U.S. Appl. No. 15/089,524, dated Nov. 17, 2016.
Search Report in Taiwan Patent Application No. 106105552, dated Jul. 1, 2020.

* cited by examiner

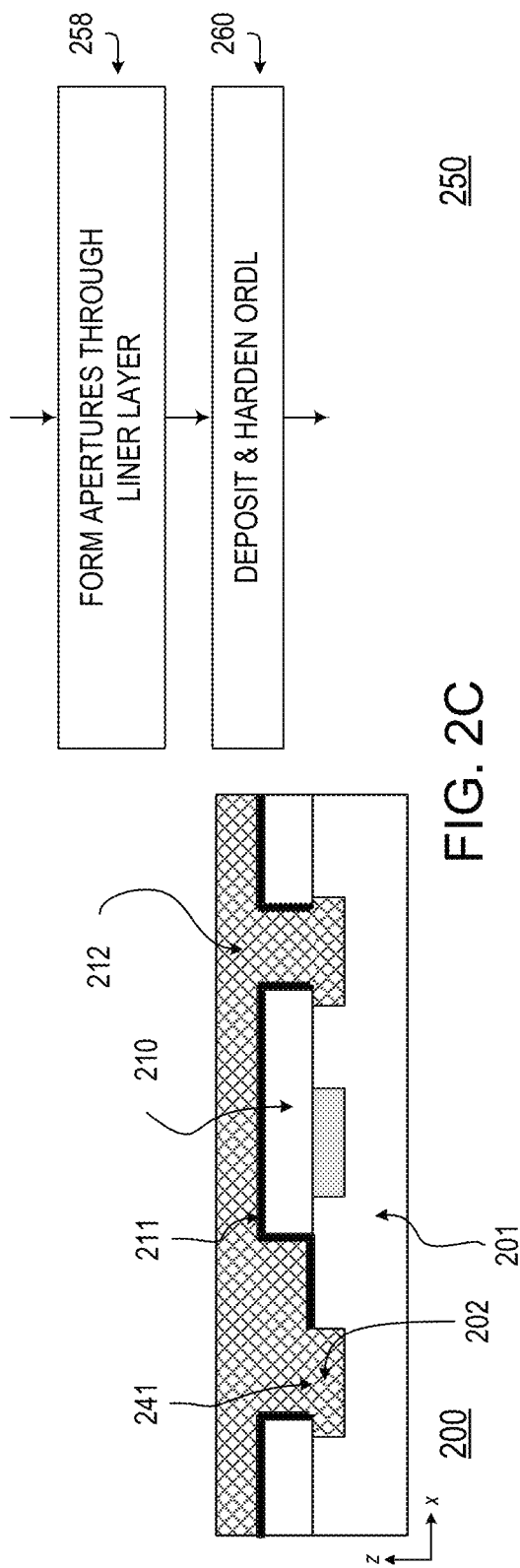
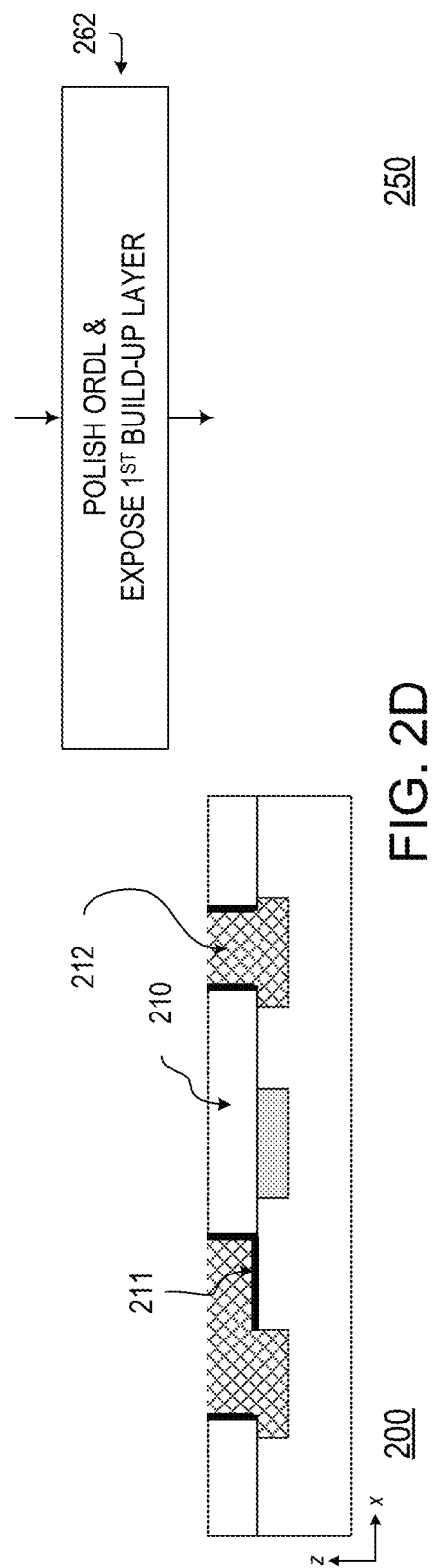

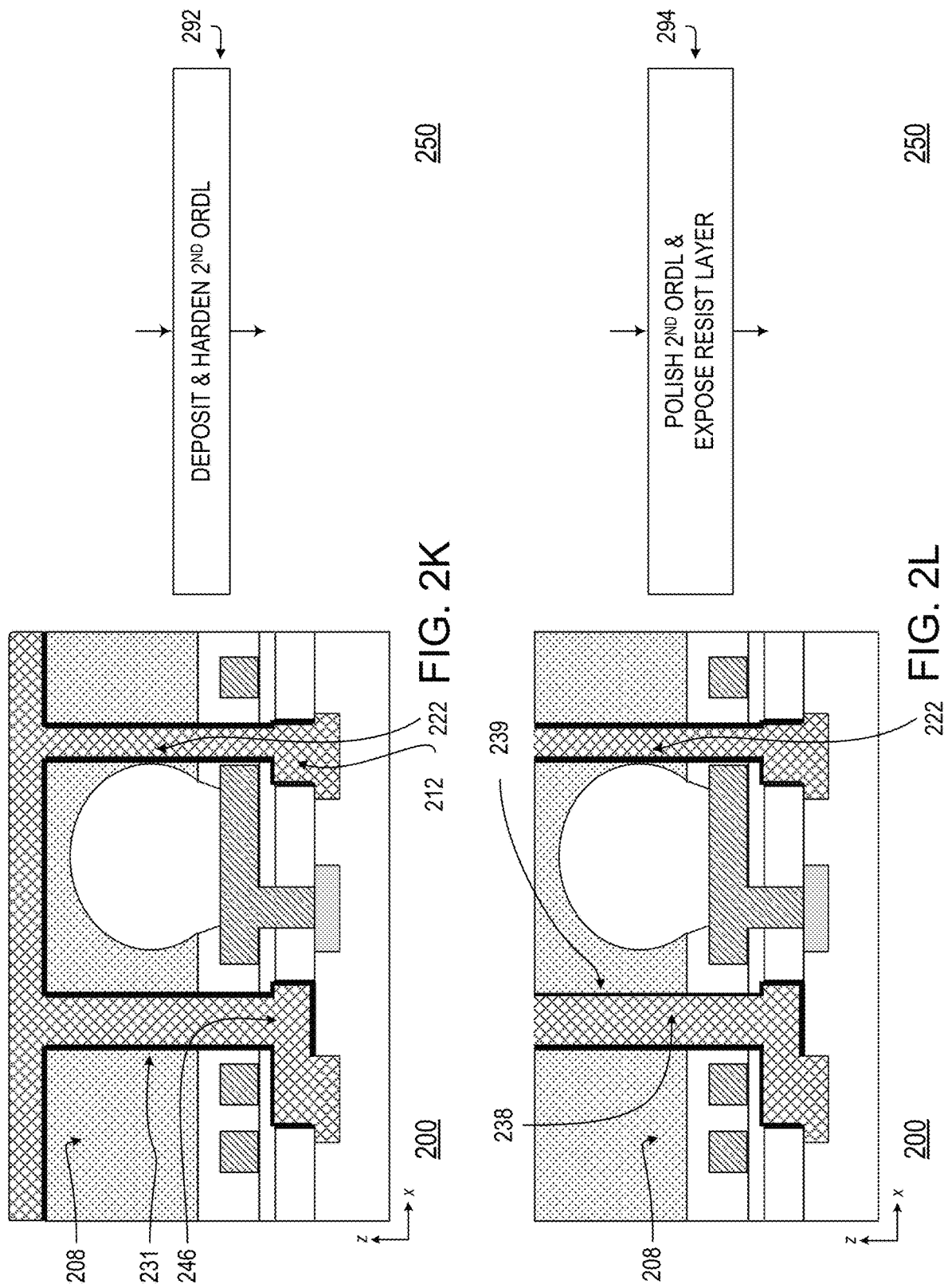

INTEGRATED CIRCUIT PACKAGES INCLUDING AN OPTICAL REDISTRIBUTION LAYER

CLAIM OF PRIORITY

This application claims priority to and is a divisional application of U.S. patent application Ser. No. 15/089,524, filed on Apr. 2, 2016, and entitled 'Integrated Circuit Packages Including an Optical Redistribution Layer,' which is incorporated herein by reference in its entirety.

BACKGROUND

Packaging of an IC chip or die often entails, in part, fabrication of electrically-isolated interconnect features through formation of patterned layers of metal and patterned layers of electrically-insulating or dielectric material (which may be referred to as build-up, or build-up material). The interconnect features may provide pathways for electrically-conductive pads on the chip to connect electrically to an external interface of the package containing the fabricated IC chip. The interconnect features may also break-out the points of electrical connection from being over or above some areas of the IC chip (e.g., the pads, which may be located in central regions or densely packed regions of the IC chip) to positions scaled for the electrical interface of the package. The interconnect features may accordingly be referred to as electrical Redistribution Layer (eRDL) features.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 2A, 2B, 2C, 2D, 2E, 2F, 2G, 2H, 2I, 2J, 2K, 2L, and 2M illustrate cross-sectional views of a packaged component comprising an optical RDL feature as a method of fabricating the packaged component is performed, and illustrate flow diagrams for a method of fabricating a packaged component comprising an optical RDL feature, in accordance with some embodiments;

DETAILED DESCRIPTION

Figure 1:
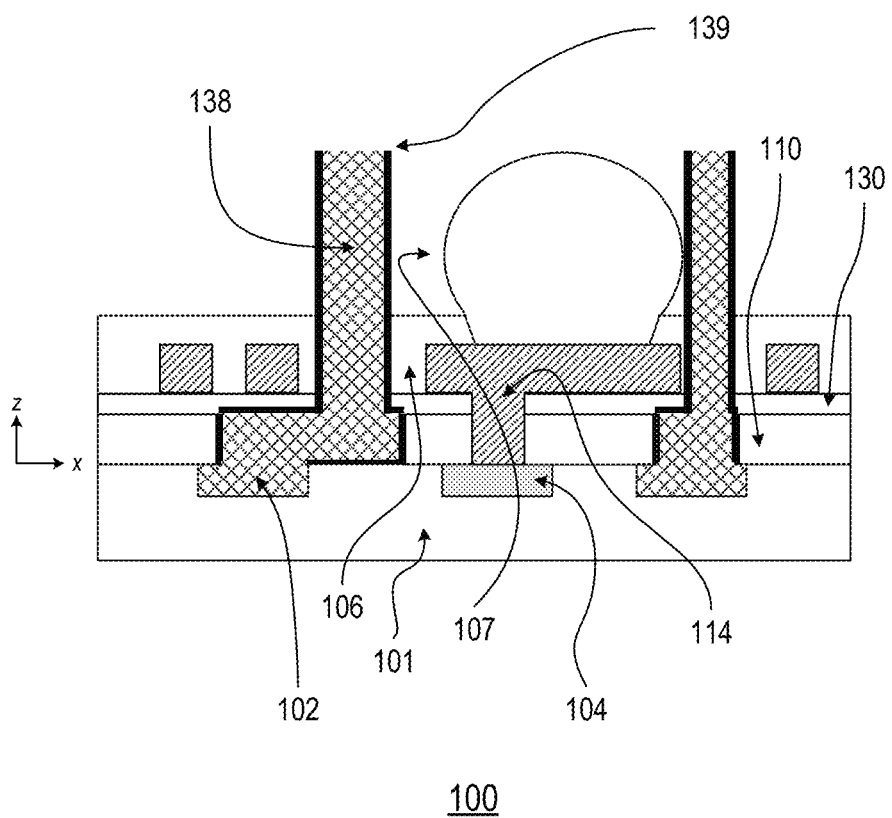
FIG. 1 illustrates a cross-sectional view of a packaged component comprising an optical Redistribution Layer feature, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings and are not intended to restrict the application of claimed subject matter. Terms such as "upper" and "lower" "above" and "below" may be understood by reference to illustrated X-Z coordinates, and terms such as "adjacent" may be understood by reference to X,Y coordinates or to non-Z coordinates. Therefore, the following detailed description is not to be taken in a limiting sense and the scope of claimed subject matter is defined solely by the appended claims and their equivalents.

In the following description, numerous details are set forth. However, it will be apparent to one skilled in the art that the various embodiments discussed herein may be practiced without these specific details. In some instances, well-known methods and devices are shown in block diagram form, rather than in detail, to avoid obscuring the embodiments. Reference throughout this specification to "an embodiment" or "one embodiment" means that a particular feature, structure, function, or characteristic described in connection with the embodiment is included in at least one embodiment. Thus, appearances of the phrase "in an embodiment" or "in one embodiment" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicate that two or more elements are in either direct or indirect (with other intervening elements between them) physical, optical, electrical, or electromagnetic contact with each other, and/or that the two or more elements co-operate or interact with each other (e.g., as in a cause-and-effect relationship).

The terms "over," "under," "between," and "on" as used herein refer to a relative position of one component or material with respect to other components or materials where such physical relationships are noteworthy. For example, in the context of materials, one material disposed over or under another material may be directly in contact with the other material and/or with one or more intervening materials. Similarly, one material disposed between two materials may be directly in contact with the two materials and/or with one or more intervening materials. In contrast, a first material "on" a second material is in direct contact with that second material. Similar distinctions are to be made in the context of component assemblies.

Described herein are packaged components including optical Redistribution Layer features. Some fabrication recipes may be directed in part toward the creation of IC chips that have optical features within and/or over a substrate. Optical features may include optical devices such as optical converters, light-emitting diodes (LEDs), laser diodes, photovoltaic cells, optical amplifiers, optical detectors, optical modulators, and/or parts of such devices.

In some embodiments discussed below, a chip packaging process creates optically-transmissive interconnect features by forming layers of an optically transmissive material and layers of a build-up material (which may include a dielectric material). The optically-transmissive interconnect features provide pathways for optical features created on the IC chip to optically couple to optically-transmissive inputs and/or outputs on an external optical interface of a package containing the IC chip. The package-level optically-transmissive interconnect features also break-out optical I/O at the chip-level to locations on the package that are better suited for the external optical interface of a board or other host to which the package is mounted. Accordingly, such interconnect features may be referred to as optical Redistribution Layer (oRDL) features.

Package processing to create oRDL features may advantageously provide reduced complexity, reduced cost, increased ease, and/or increased flexibility of manufacturing optical components, and may advantageously facilitate the incorporation of optical components within a package. In addition, package processing described herein to create oRDL features may advantageously integrate the oRDL features with eRDL features of a chip package. In turn, such integrated package redistribution layers may provide reduced complexity, reduced cost, increased ease, and/or increased flexibility of integrating electronic components with optical components.

FIG. 1 illustrates a cross-sectional view of a portion of a packaged component 100 comprising an oRDL feature 138, in accordance with some embodiments. Packaged component 100 comprises an IC chip 101. IC chip 101 includes an optical component, such as, but not limited to, a photo diode operable to receive over an optical band or laser diode operable to transmit over an optical band. At least a portion of IC chip 101 has a semiconductor lattice structure suitable for semiconductor devices, such as but not limited to transistors. In various embodiments, substrate 101 may include a group IV semiconductor material such as silicon. In some embodiments, substrate 101 may include a composite group III/group V semiconductor material, such as gallium arsenide.

Substrate 101 has one or more optical contact areas 102, which comprise an optically-transmissive or optically sensitive material. Optical contact areas 102 may be optically coupled to one or more optical devices, which may accept optical input signals (e.g., incident light) through optical contact areas 102 and which may in turn be operable to respond to the optical signals by converting and/or propagating them. Such optical devices may include, for example, optical converters, optical diodes, optical amplifiers, optical detectors, optical modulators, photovoltaic cells, and/or parts of such devices. Optical contact areas 102 may also be operable to emit optical signals by generating and/or propagating them. Such optical devices may include, for example, light-emitting diodes and laser diodes.

In various embodiments, one or more of optical contact areas 102 may be optically coupled to parts of optical devices within substrate 101. Optical contact areas 102 may accordingly be operable to accept incident optical signals (e.g., incident light) and guide or otherwise deliver the optical signals to parts of optical devices, or to guide or otherwise deliver optical signals from parts of optical devices.

Substrate 101 additionally has one or more electrical contact areas 104, which comprise an electrically-conductive material. Electrical contact areas 104 may be electrically coupled with one or more electronic devices, which may accept electrical signals (e.g., electric currents) through electrical contact areas 104 and which may in turn be operable to respond to the electrical signals by processing and/or propagating them, or which may deliver electrical signals through electrical contact areas 104. Such electronic devices may include transistors, diodes, and thyristors, and/or parts of such devices. Some embodiments of packaged component 100 may not have electrical contact areas 104.

In various embodiments, one or more of electrical contact areas 104 may be electrically coupled to parts of electrical devices within substrate 101. Electrical contact areas 104 may accordingly be operable to accept electrical signals (e.g., electric currents) and propagate the electrical signals to parts of electrical devices, or to guide or otherwise deliver electrical signals from parts of electrical devices. Some electrical contact areas 104 may be electrically-conductive pads for electrically coupling electrical devices of substrate 101 to structures outside substrate 101.

Optical contact areas 102 and electrical contact areas 104 are positioned on a patterned side or region of substrate 101, such as front or back sides of substrate 101. Optical contact areas 102 and electrical contact areas 104 accordingly form parts of front or back surfaces of substrate 101, which is a patterned surface of substrate 101.

Packaged component 100 comprises one or more dielectric build-up layers positioned over and/or on portions of the patterned surface of substrate 101. The various build-up layers comprise a dielectric material. For example, some of the build-up, such as lower build-up layer 110 and upper build-up layer 130, may comprise an organic material, an epoxy thermoset, or a thermoplastic material. Solder-mask 106 disposed over the build-up may also be formed of a similar polymer material that is likewise deposited and cured or applied as a dry film.

The package build-up has a layered structure, with various layers of build-up positioned on top of each other. For example, the one or more build-up layers comprise a lower build-up layer 110 positioned over and/or on portions of substrate 101. Lower build-up layer 110 is accordingly in direct contact with various portions of the patterned surface of substrate 101, including portions of optical contact areas 102 and portions of electrical contact areas 104. The build-up also comprises an upper build-up layer 130 positioned over and/or on portions of lower build-up layer 110. Upper build-up layer 130 is accordingly in direct contact with various portions of lower build-up layer 110. Solder mask 106 is positioned over and/or on portions of upper build-up layer 130. Although only a few build-up layers are depicted in FIG. 1, a build-up material in packaged component 100 may include any number of build-up layers.

Packaged component 100 also comprises one or more oRDL features 138, which extend from optical contact areas 102 to an exterior of packaged component 100. As depicted in FIG. 1, for example, each oRDL feature 138 has a first terminus that is optically coupled with optical contact areas 102. In some embodiments, the first terminus may be in direct contact with optical contact areas 102. As depicted, each oRDL feature 138 also has a second terminus positioned at, or extending through, openings or apertures in an outer surface of the various build-up layers (e.g., openings in an outer surface of solder mask 106). Between the first terminus and the second terminus, each oRDL feature 138 extends through the various build-up layers, and the various build-up layers accordingly extend around portions of oRDL features 138.

oRDL features 138 comprise an optically-transmissive material (e.g., a material that transmits electromagnetic radiation in a given optical band). In some embodiments, oRDL features 138 include a substantially transparent material for a desired range of wavelengths over which optical devices on substrate 101 are operable. In some embodiments, the optically-transmissive material may be an epoxy material. In some embodiments, the optically-transmissive material is polymethyl methacrylate (PMMA).

Packaged component 100 comprises one or more liners 139 sheathing, coating, or encasing one or more surfaces of oRDL features 138. Liners 139 are to contain optical energy within oRDL features 138. Liners 139 may be optically reflective. In various embodiments, liners 139 may be in direct contact with oRDL features 138. Liners 139 of some embodiments comprise an electrically-conductive material (e.g., a metal) and/or a material having a refractive index below that of a refractive index of a material of oRDL features 138, to provide a sufficient refractive index contrast for internal reflection. For some embodiments, liners 139 may comprise one or more of aluminum, copper, or titanium. In some embodiments, liners 139 comprise a metal nitride, such as, but not limited to, titanium nitride. Liners 139 may advantageously reduce optical signal loss into the build-up layers surrounding oRDL features 138.

For other embodiments of packaged component 100, however, one or more oRDL features 138 may not include liners 139. For such embodiments, material properties of the package build-up (e.g., lower build-up layer 110, upper build-up layer 130, and/or solder mask 106) may advantageously reduce optical signal loss, such as by providing beneficial optical reflectivity, for example as a result of index contrast with the material employed in oRDL features 138. In some such embodiments, the package build-up may comprise a material substantially non-transmissive to the optical wavelength transmitted by oRDL features 138.

Liners 139 sheathe or otherwise cover substantially all surfaces of oRDL features 138. In some embodiments however, liner 139 is present on sidewalls of oRDL features 138 but is absent from one or more surfaces that are to couple light vertically (e.g., z-dimension). The absence of liners 139 in select regions enables oRDL features 138 to directly contact optical contact areas 102. Liners 139 may also be absent from surfaces of the package that are to optically couple with a component external to packaged component 100. In other embodiments, liners 139 may merely partially sheathe or otherwise cover oRDL features 138. For example, liners 139 may sheathe portions of oRDL features 139 not surrounded by various build-up layers. Other portions of oRDL features not sheathed by liners 139 may be in contact with, for example, reflective surfaces of the build-up layers (as discussed above).

In embodiments that include the creation of eRDL features, packaged component 100 also comprises one or more eRDL features 114 and one or more solder connections 107. Before packaged component 100 is integrated with a host, solder connections 107 may have a substantially spherical shape. After packaged component 100 is mounted to a host, solder connections 107 may no longer have a substantially spherical shape (potentially as a result of a reflow process), and may take a more cylindrical or even hourglass-like shape. Embodiments of packaged component 100 that do not include electrical contact areas 104 may also lack eRDL features 114 and solder connections 107.

One or more of eRDL features 114 extend from electrical contact areas 104 to solder connections 107. As depicted in FIG. 1, each eRDL feature 114 has a first terminus that is coupled with an electrical contact area 104, which is an electrically-conductive pad formed on substrate 101. In various embodiments, the first terminus may be in direct contact with electrical contact areas 104. eRDL features 114 also have a second terminus positioned proximal to openings or apertures in one or more of the build-up layers, such a ball grid array (BGA) pad surrounded by solder mask 106. Solder connections 107 are disposed within and/or adjacent to the openings or apertures in solder mask 106. The second terminus of each eRDL feature 114 is coupled to a solder connection 107. Between the first terminus and the second terminus, eRDL features 114 extend through the various build-up layers, and the various build-up layers accordingly extend around portions of eRDL features 114.

eRDL features 114 may comprise any electrically-conductive material, such as a metal. Solder connections 107 are accordingly electrically coupled to electrical contact areas 104, through eRDL features 114.

Solder connections 107 extend outward a first distance from an outer surface of the build-up material. Similarly, oRDL features 138 extend vertically (e.g., z-dimension) beyond the outer surface of the package build-up to form optically transmissive posts extending outward a second distance from the outer surface. In some embodiments, the second distance may be substantially equal to the first distance.

The optically transmissive posts extending outward from the outer surface have a longitudinal length (e.g., z-dimension) oriented substantially normal to a patterned surface of substrate 101, as well as a transverse width (e.g., x-dimension) oriented substantially parallel to substrate 101. In some embodiments, a ratio of the longitudinal length to the transverse width is greater than 2. In some embodiments, that ratio is greater than 3, and may even be greater than 5.

In some embodiments, the longitudinal length of optically transmissive posts 138 is substantially equal to a solder ball diameter and/or z-height of a solder joint. A subsequent integration process may be advantageously facilitated by oRDL features 138 extending to a same z-height as eRDL features 114. For such embodiments, both oRDL features 138 and eRDL features 114 may interface with substantially co-planar features of a host external to packaged component 100.

In various embodiments, packaged component 100 may comprise one or more regions in which oRDL features 138 and eRDL features 114 physically overlap. Portions of oRDL features may be positioned above, over, and/or on portions of eRDL features 114, and may accordingly overlap portions of eRDL features 114. Similarly, portions of eRDL features 114 may be positioned above, over, and/or on portions of oRDL features 138, and may accordingly overlap portions of oRDL features 138. In some such embodiments, a portion of a build-up may be positioned between overlapping portions of oRDL features 138 and portions of eRDL features 114. In other embodiments, portions of eRDL features 114 that overlap portions of oRDL features 138 may be in direct contact with those portions of oRDL features 138. For embodiments that include liner 139, portions of eRDL features 114 that overlap portions of oRDL features 138 may be in direct contact with liner 139 covering those portions of oRDL features 138.

The material and/or structural properties of oRDL features 138 and eRDL features 114 may advantageously permit them to be located in proximity to each other without either feature disruptively interfering with the functionality of the other. Portions of the two types of features may accordingly overlap each other, or may otherwise be in close proximity with each other (e.g., adjacent within a same build-up layer), without the operation of either type of RDL feature being inherently interfered with or disrupted. As a result, fabrication processes to create oRDL features may be integrated with fabrication processes to create eRDL features. In turn, such integrated fabrication processes may advantageously provide reduced complexity, reduced cost, increased ease, and/or increased flexibility of manufacturing components that integrate electronic devices with optical devices.

As discussed above, packaged component 100 comprises substrate 101, optical contact areas 102, various build-up layers such as lower build-up layer 110, upper build-up layer 130, and oRDL features 138. Packaged component 100 also comprises liners 139, electrical contact areas 104, solder mask 106, and eRDL features 114, although these features may be absent in some embodiments of packaged component 100. Since these features may be monolithically formed, as discussed in detail immediately below, packaged component 100 is accordingly a monolithic packaged component.

FIGS. 2A, 2B, 2C, 2D, 2E, 2F, 2G, 2H, 2I, 2J, 2K, 2L, and 2M illustrate cross-sectional views of a packaged component comprising an oRDL feature as a method of fabricating the packaged component is performed, and illustrate flow diagrams of a method of fabricating a packaged component comprising an oRDL feature, in accordance with some embodiments.

Figure 2A:
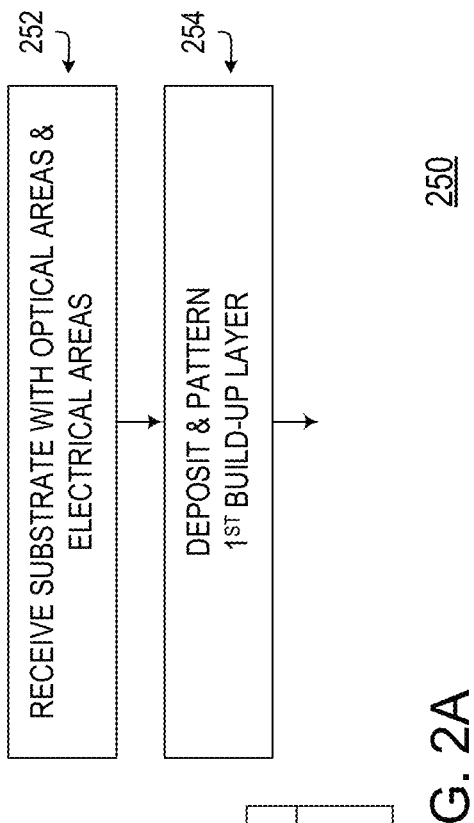
Figure 2A:
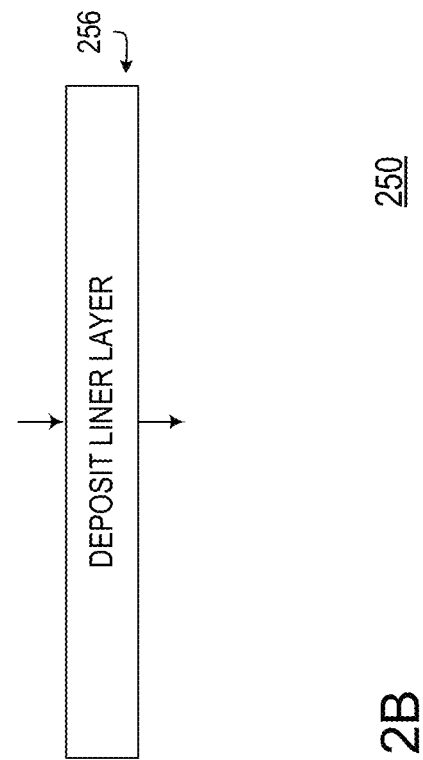

A method 250 may be undertaken to fabricate a packaged component 200. As depicted in FIG. 2A, in some embodiments, method 250 comprises receiving a workpiece at operation 252 and depositing and patterning a build-up layer at operation 254. In the illustrative embodiment, an IC chip 201 having a patterned surface with one or more optical areas 202 is received at operation 252. For the depicted embodiment, which includes the creation of eRDL features, the patterned surface of IC chip 201 also has one or more electrical areas 204. The IC chip may comprise a semiconductor lattice suitable for use in a semiconductor device fabrication process, and may include a material such as silicon or gallium arsenide.

At operation 254, a first build-up layer 210 is deposited over IC chip 201 and optical contact areas 202. First build-up layer 210 is then patterned to at least partially expose IC chip 201 and optical contact areas 202. For the depicted embodiment, which includes the creation of eRDL features, first build-up layer 210 is also deposited over electrical contact areas 204, and is also patterned to at least partially expose electrical contact areas 204. First build-up layer 210 may comprise a dielectric material, such as an organic material, an epoxy thermoset, or a thermoplastic material. Any thin film or dry film, or spin-and-cure deposition process known in the art may be employed at operation 254.

Figure 2B:
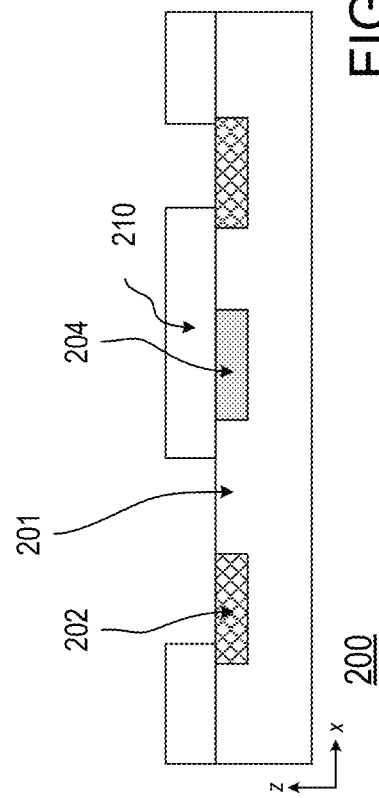
Figure 2B:
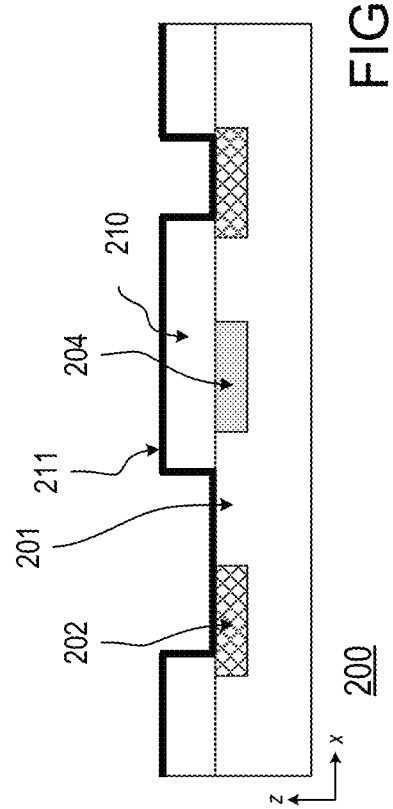

For the embodiment depicted in FIG. 2B, which includes the creation of liners around oRDL features, a liner layer 211 is deposited over first build-up layer 210 at operation 256. Liner layer 211 may also be deposited over any exposed portions of IC chip 201, and over any exposed optical contact areas 202. For the depicted embodiment, which includes the creation of eRDL features, liner layer 211 is also deposited over any exposed electrical contact areas 204. Any deposition process known in the art may be employed at operation 256. For example, a metal may be deposited by physical vapor deposition (PVD).

For the embodiment depicted in FIG. 2C, which includes the creation of liners around oRDL features, one or more apertures 241 is formed through liner layer 211 at operation 258. Apertures 241 may be formed, for example, by laser drilling or a suitable etching process. Apertures 241 are formed through portions of liner layer 211 above optical contact areas 202. The formation of apertures 241 accordingly exposes portions of optical contact areas 202.

Liner layer 211 may comprise a conductive material and/or a material having a refractive index below that of a refractive index of a material that will be subsequently deposited as the oRDL. In some embodiments, liner layer 211 is a metal. In some such embodiments, liner layer 211 may comprise one or more of aluminum, copper, or titanium. In some embodiments, liner layer 211 may comprise a metal nitride, such as, but not limited to, titanium nitride.

As is further depicted in FIG. 2C, method 250 continues at operation 260 where an oRDL 212 is deposited over build-up layer 210, any exposed portions of IC chip 201, and any exposed optical contact areas 202. oRDL 212 is subsequently hardened. For the depicted embodiment, which includes the creation of liners around oRDL features, oRDL 212 is deposited over liner layer 211, and over any exposed portions of optical contact areas 202 through apertures 241.

oRDL 212 comprises an optically transmissive material. In some embodiments, oRDL 212 includes an epoxy material. In various embodiments, oRDL 212 comprises PMMA.

In some embodiments represented by FIG. 2D, oRDL 212 is polished back (e.g., by chemical mechanical planarization), and overburden of oRDL 212 thereby removed. The polishing exposes first build-up layer 210 and a pattern of various portions of oRDL 212 in-between portions of the exposed first build-up layer 210 (e.g., x-dimensionally). The polishing may also planarize oRDL 212 with a top surface of the exposed build-up layer 210.

For the depicted embodiment, which includes the creation of liners around oRDL features, the polishing also removes portions of liner layer 211 above build-up layer 210 to expose build-up layer 210. In such embodiments, portions of liner layer 211 are left between IC chip 201 and portions of oRDL 212 that may be positioned above IC chip 201. In addition, portions of liner layer 211 are left between build-up layer 210 and the various portions of oRDL 212 in-between portions of the exposed build-up layer 210.

Figure 2E:
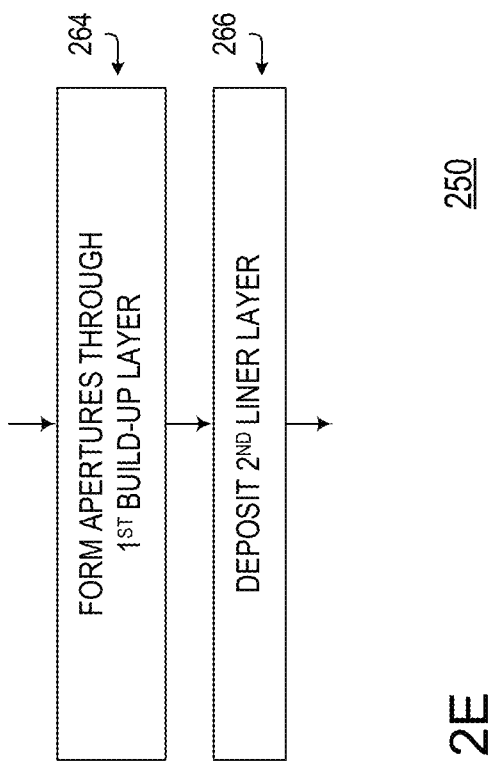

For some embodiments, as depicted in FIG. 2E, which include the creation of eRDL features, one or more apertures 242 may be formed completely through portions of build-up layer 210 to expose portions of electrical contact areas 204. Apertures 244 may be formed, for example, by laser drilling or a suitable etching process. For the depicted embodiment, which includes the creation of liners around oRDL features, another liner layer 221 is deposited on build-up layer 210, on oRDL 212, and on any exposed portions of electrical contact areas 204. Liner layer 221 may be any of the materials provided above for liner layer 211, for example.

Figure 2F:
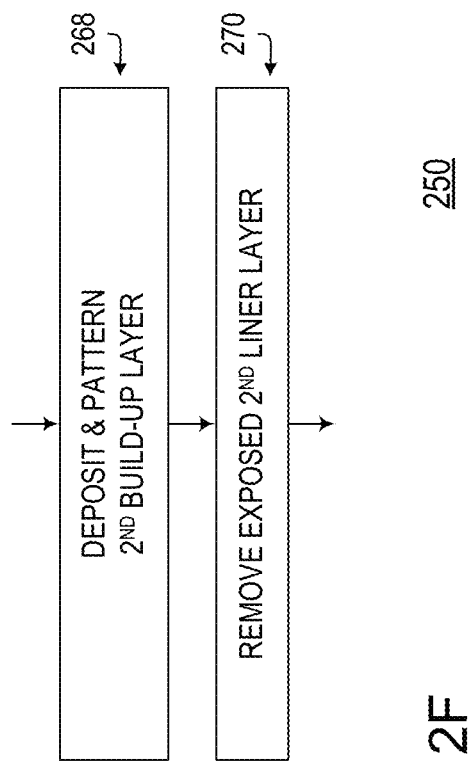
Figure 2G:
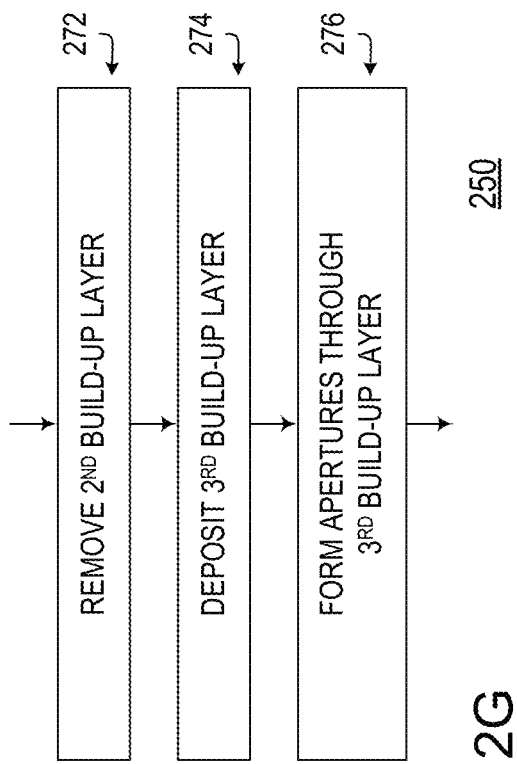
Figure 2G:
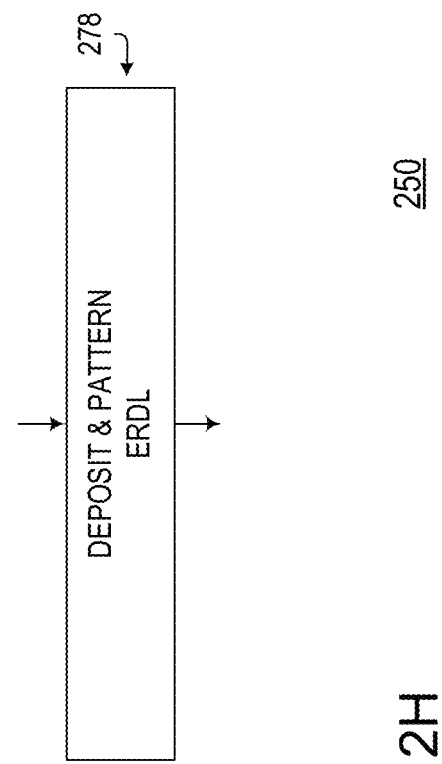

For some embodiments, as depicted in FIG. 2F, which include the creation of liners around oRDL features, at operation 268 another build-up layer 220 is deposited over liner layer 221. Build-up layer 220 may be any of the materials provided above for build-up layer 210. Build-up layer 220 is then patterned, leaving exposed portions of liner layer 221. Exposed portions of liner layer 221 are then removed at operation 270, leaving portions of liner layer 221 between oRDL 212 and build-up layer 220. With reference to FIG. 2G, in removing 272, second build-up layer 220 may be thinned or completely removed, leaving exposed portions of build-up layer 210 and portions of liner layer 221 above oRDL 212. For the depicted embodiment, which includes the creation of eRDL features, the removal of build-up layer 220 additionally leaves exposed portions of electrical contact areas 204.

In some embodiments represented by FIG. 2G, another build-up layer 230 is deposited over build-up layer 210 and oRDL 212. For the depicted embodiment, which includes the creation of liners around oRDL features, build-up layer 230 is also disposed over portions of liner layer 221 above oRDL 212.

For the depicted embodiment, which includes the creation of eRDL features, build-up layer 230 is also deposited over exposed portions of electrical contact areas 204. For such embodiments, at operation 276 a plurality of apertures 243 is then formed through portions of build-up layer 230 over electrical contact areas 204. Apertures 243 may be formed, for example, by laser drilling or a suitable etching process.

Figure 2H:
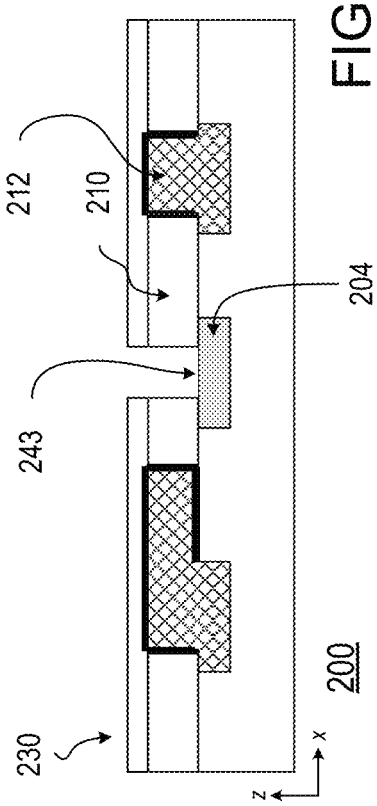
Figure 2H:
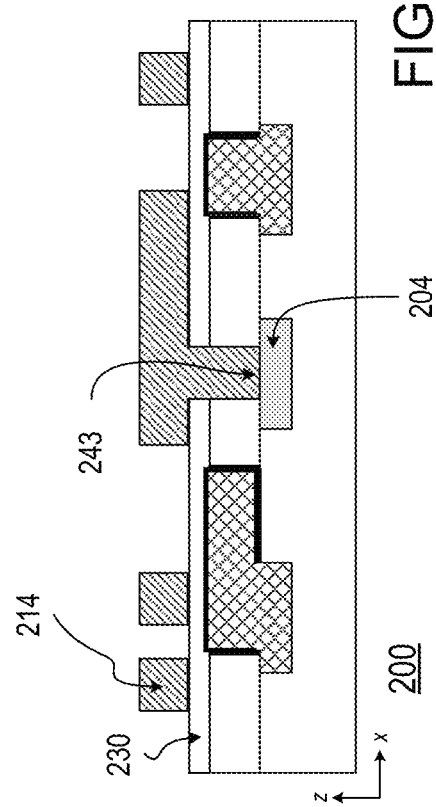

With reference to FIG. 2H, at operation 278 an eRDL 214 is deposited over build-up layer 230, and over exposed portions of electrical contact areas 204 through apertures 243. eRDL 214 is then patterned to form various features, such as one or more electrically-conductive pads, and one or more eRDL features extending between electrical contact areas 204 and the electrically-conductive pads.

Figure 2I:
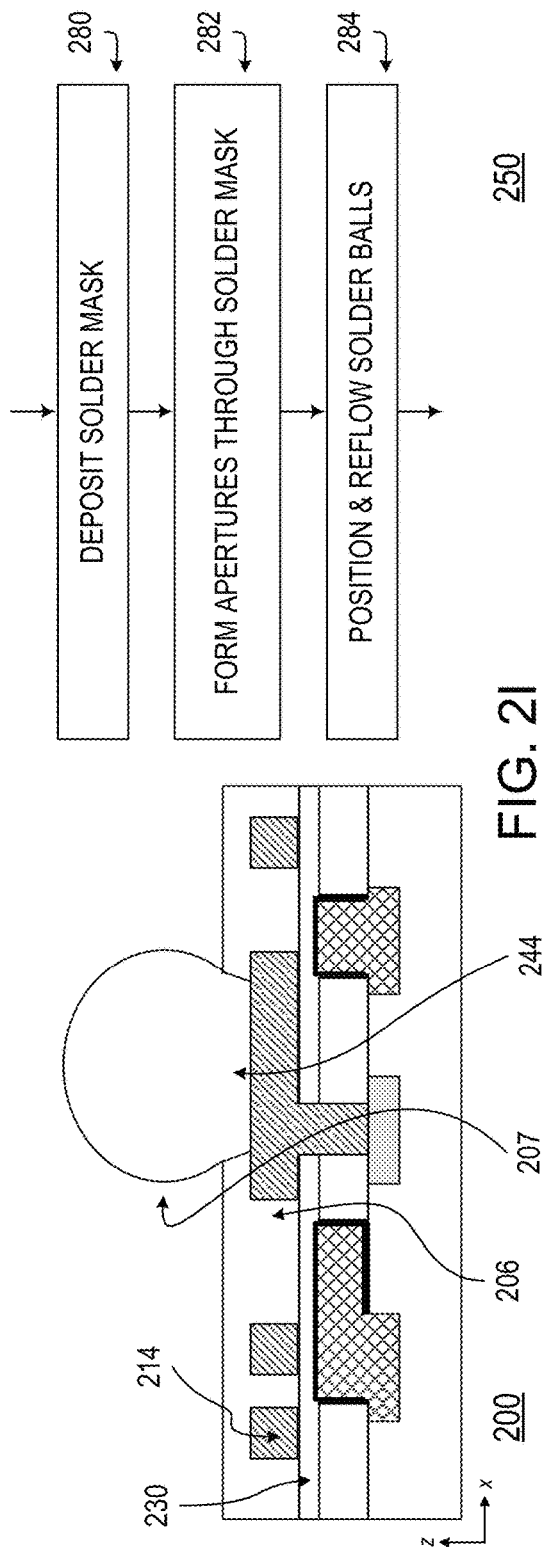

With reference to FIG. 2I, at operation 280, a solder mask 206 is deposited over eRDL 214 and over build-up layer 230. One or more apertures 244 are formed to extend completely through solder mask 206 and expose portions of the electrically-conductive pads of eRDL 214. Any known solder mask patterning process may be employed at operation 280. At operation 284, one or more solder connections 207 are positioned within apertures 244 and above the exposed portions of the electrically-conductive pads. A solder reflow then electrically couples solder connections 207 to the exposed electrically-conductive pads of eRDL 214.

Figure 2J:
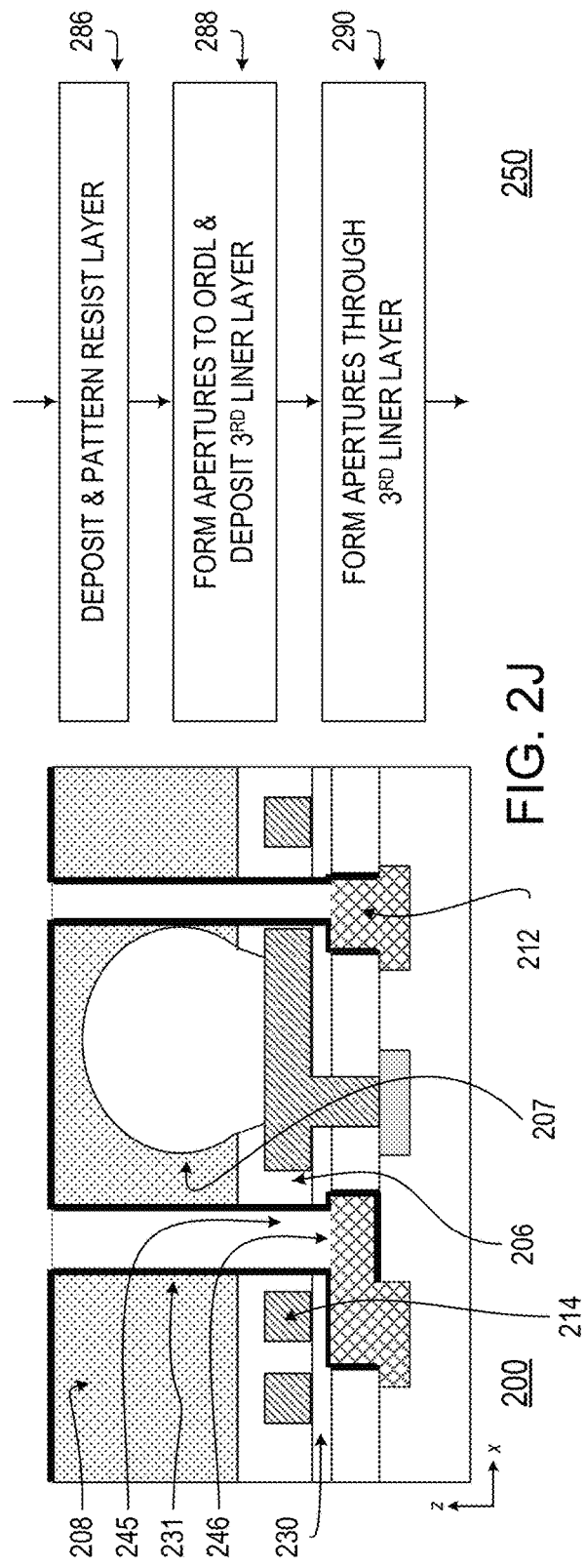

In some embodiments, as further illustrated in FIG. 2J, a resist layer 208 is deposited over build-up layer 230. Resist layer 208 is then patterned to expose portions of build-up layer 230. Resist layer 208 may be a light sensitive polymer, or a hardmask which may be removable by reactive ion etching. Subsequently, at operation 288 a plurality of apertures 245 are formed through build-up layer 230.

For the depicted embodiment, which includes the creation of eRDL features, resist layer 208 is also deposited over eRDL 214, solder mask 206, and solder connections 207, and resist layer 208 is patterned to expose portions of solder mask 206. Subsequently, at operation 288, apertures 245 are additionally etched into solder mask 206.

For the depicted embodiment, which includes the creation of liners around oRDL features, at operation 288 another liner layer 231 is deposited on exposed portions of oRDL 212, and also on sidewalls of apertures 245, which comprise portions of resist layer 208 and third build-up layer 230. The aperture sidewalls also include portions of solder mask 206 for the depicted embodiment that includes the formation of eRDL features). At operation 290, a plurality of apertures 246 are formed completely through portions of liner layer 230, thereby exposing portions of oRDL 212. Apertures 246 may be formed using methods similar to those used to form the apertures through liner layer 211.

FIG. 2K depicts operation 292 where an oRDL 222 is deposited over resist layer 208 and exposed portions of oRDL 212. For the depicted embodiment, which includes the creation of liners around oRDL features, oRDL 222 is also deposited over liner layer 231, and is deposited through apertures 246 over exposed portions of oRDL 212. oRDL 222 is subsequently hardened. oRDL 222 may comprise a material similar to, or the same as, oRDL 212.

As depicted in FIG. 2L, at operation 250 oRDL 222 is polished back, and overburden of oRDL 222 thereby removed. The polishing exposes resist layer 208. For the depicted embodiment, which includes the creation of liners around oRDL features, the polishing additionally removes portions of liner layer 231 above resist layer 208 to expose resist layer 208.

The polishing accordingly forms one or more oRDL features 238 comprising portions of oRDL 212 and portions of RDL 222. For the depicted embodiment, which includes the creation of liners around oRDL features, the polishing also forms one or more liners 239 around oRDL features 238. Liners 239 comprise portions of liner layer 211, portions of liner layer 221, and portions of liner layer 231.

Figure 2M:
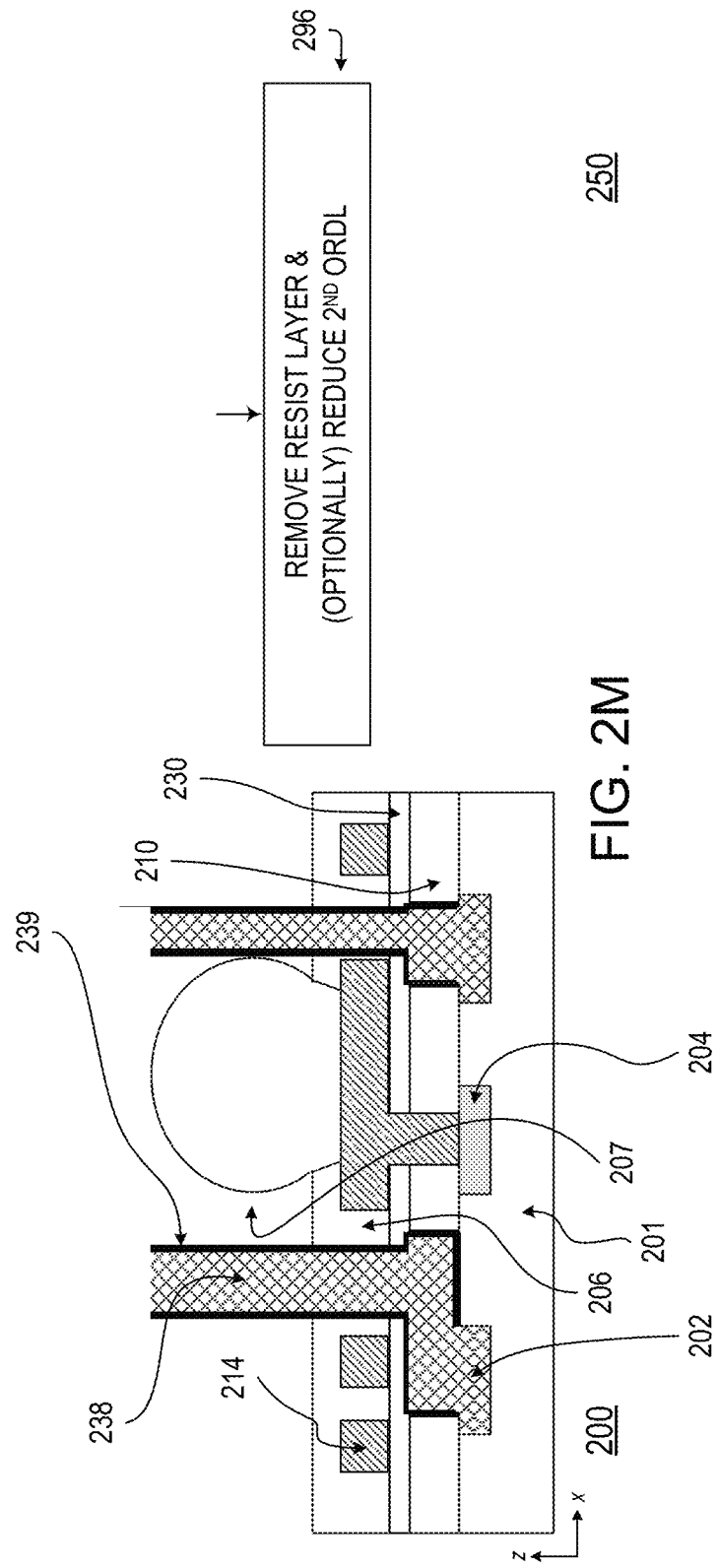

In FIG. 2M, resist layer 208 is removed at operation 296 to expose build-up layer 230. For the depicted embodiment, which includes the creation of eRDL features, the removal of resist layer 208 exposes solder mask 206 and solder connections 207 which (along with eRDL features 214) are positioned above build-up layer 230. For the depicted embodiment, which includes the creation of liners around oRDL features, the removal of resist layer 208 additionally exposes portions of liners 239.

Removal of resist layer 208 accordingly forms a packaged component 200 similar to packaged component 100 of FIG. 1. As depicted, packaged component 200 comprises an IC chip 201, one or more optical contact areas 202 coupled to one or more oRDL features 238, one or more liners 239 sheathing oRDL features 238, one or more electrical contact areas 204 coupled to one or more eRDL features 214 and coupled (through eRDL features 214) to one or more solder connections 207, and various build-up layers such as first build-up layer 210, second build-up layer 230, and solder mask 206. eRDL features 238 and solder connections 207 extend outward from an upper surface of solder mask 206 to approximately equivalent distances (although in some embodiments, eRDL features 238 and solder connections 207 may extend outward from the upper surface of solder mask 206 to different z-heights).

Figure 3:
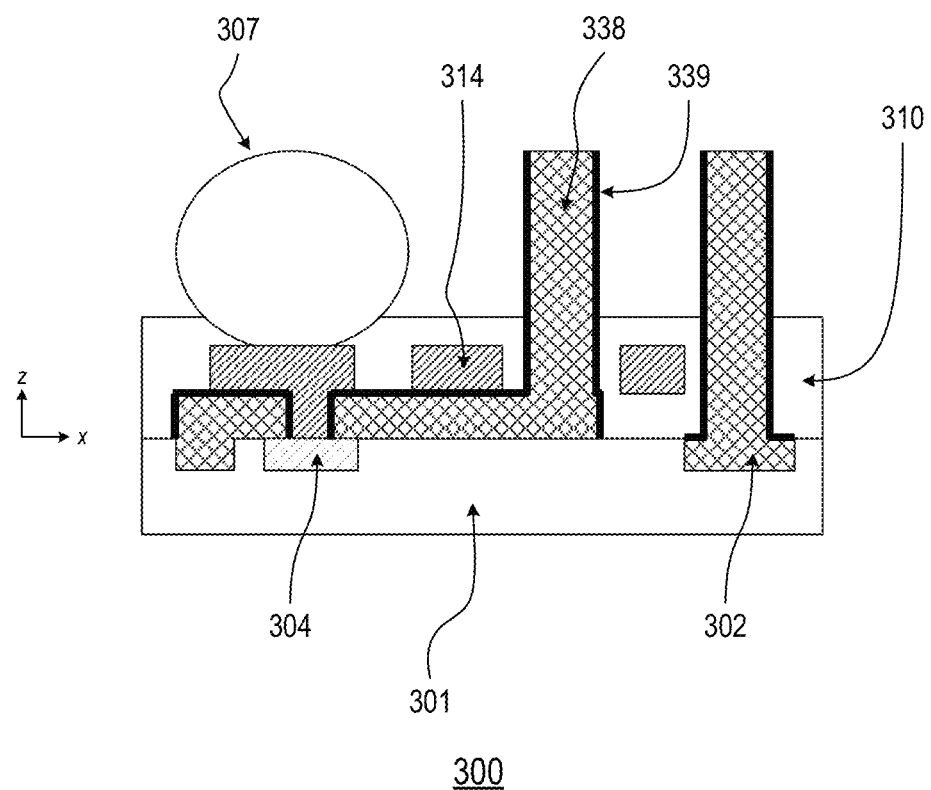
FIG. 3 illustrates a cross-sectional view of a packaged component comprising an optical RDL feature, in accordance with some embodiments.

FIG. 3 illustrates a cross-sectional view of a packaged component comprising an oRDL feature, in accordance with some embodiments. Packaged component 300 is similar to packaged component 200. Packaged component 300 comprises an IC chip 301, one or more optical contact areas 302 coupled to one or more oRDL features 338, which are sheathed by one or more liners 339, and one or more electrical contact areas 304 coupled to one or more solder connections 307 through one or more eRDL features 314.

Packaged component 300 comprises a build-up 310. While build-up 310 is similar to build-up layer 210, build-up layer 230, and solder mask 206 of packaged component 200, build-up 310 does not extend between and separate portions of oRDL features 338 from portions of eRDL features 314. Accordingly, portions of eRDL features 314 directly contact portions of liners 339 sheathing oRDL features 338 and/or, in some embodiments, portions of oRDL features 338 themselves.

Figure 4:
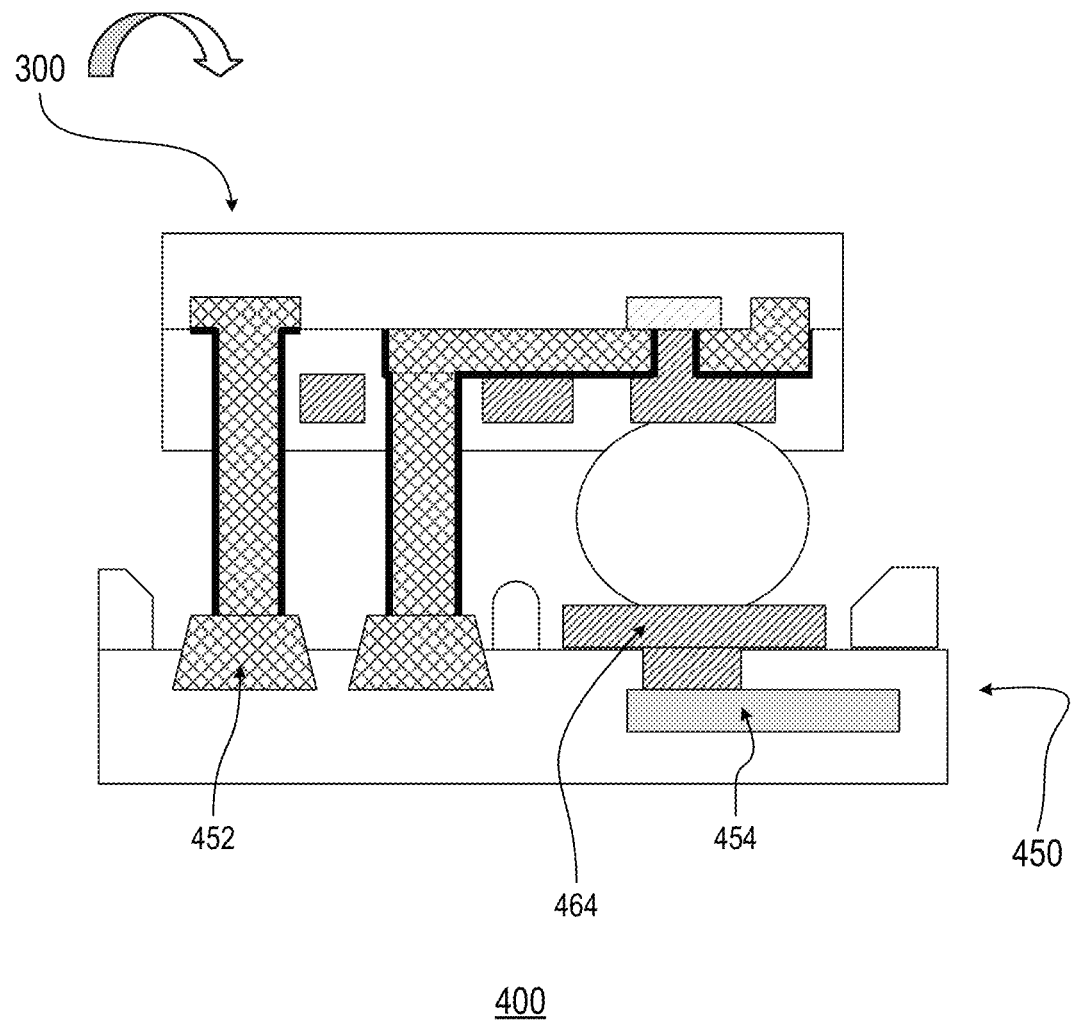
FIG. 4 illustrates a cross-sectional view of a packaged component comprising an optical RDL feature both electrically coupled and optically coupled to a printed circuit board (PCB) component, in accordance with some embodiments.

FIG. 4 illustrates a cross-sectional view of a packaged component 300 comprising an oRDL feature both electrically coupled and optically coupled to a PCB component 450, in accordance with some embodiments. In FIG. 4, a PCB component 450 comprises one or more optical contact areas 452, such as light conducting areas, which is optically coupled to one or more optical devices disposed on PCB component 450. PCB 450 similarly comprises one or more electrical contact areas 454, which are electrically coupled to one or more electrically conducting features 464.

As depicted in FIG. 4, packaged component 300 may be oriented to place oRDL features 238 near optical contact areas 452, and to place solder connections 307 near electrically conducting features 464. oRDL features 238 may then be optically coupled to optical contact areas 452, and solder connections 307 may be electrically coupled to electrical contact areas 454 (e.g., by a reflow operation that may flow both the oRDL post and solder). Packaged component 300 and PCB 450 may accordingly be integrated into a package 400.

Figure 5:
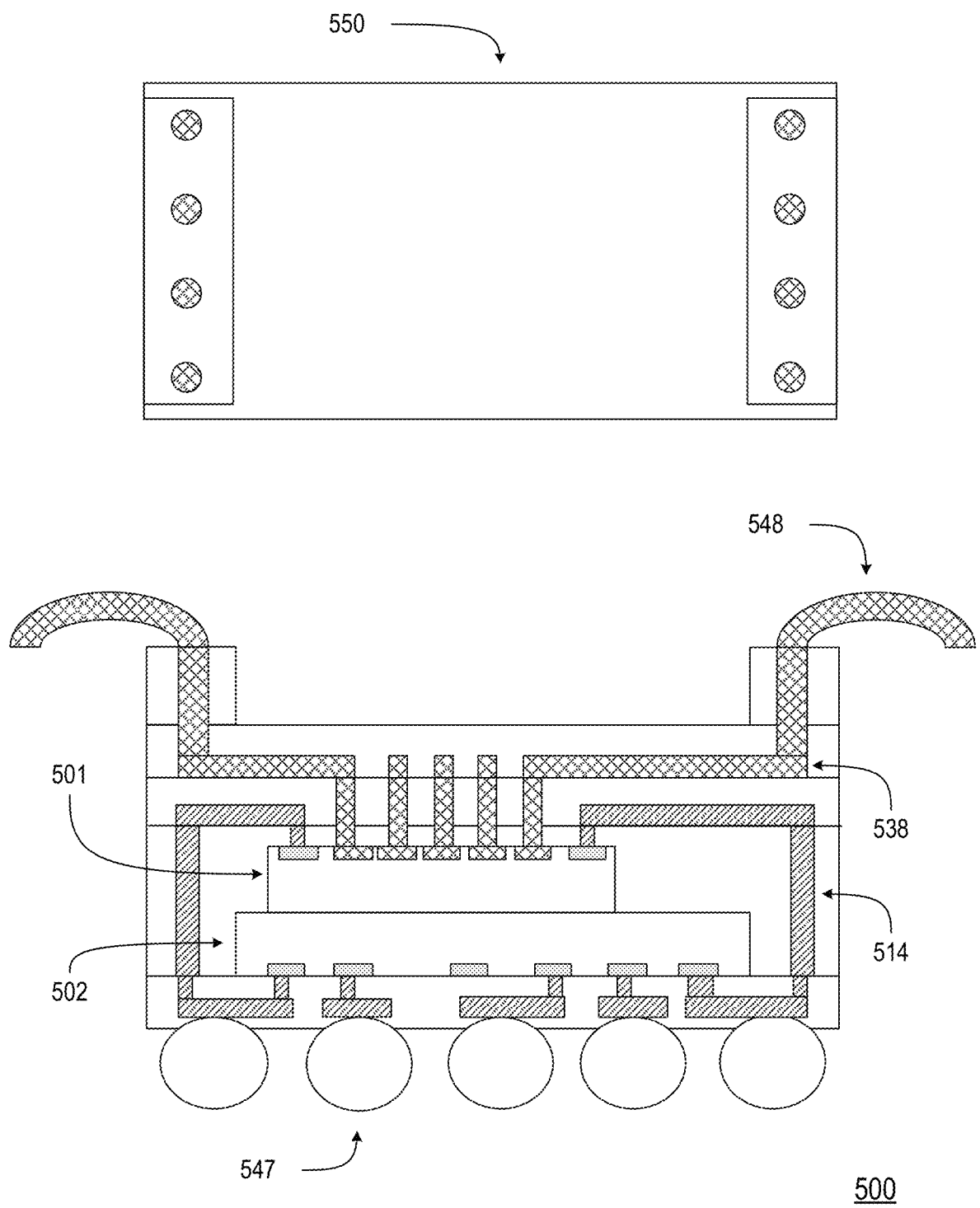
FIGS. 5 and 6 illustrate cross-sectional views of packages integrating packaged components with optical RDL features, and illustrate plan views of the packages, in accordance with some embodiments.
Figure 6:
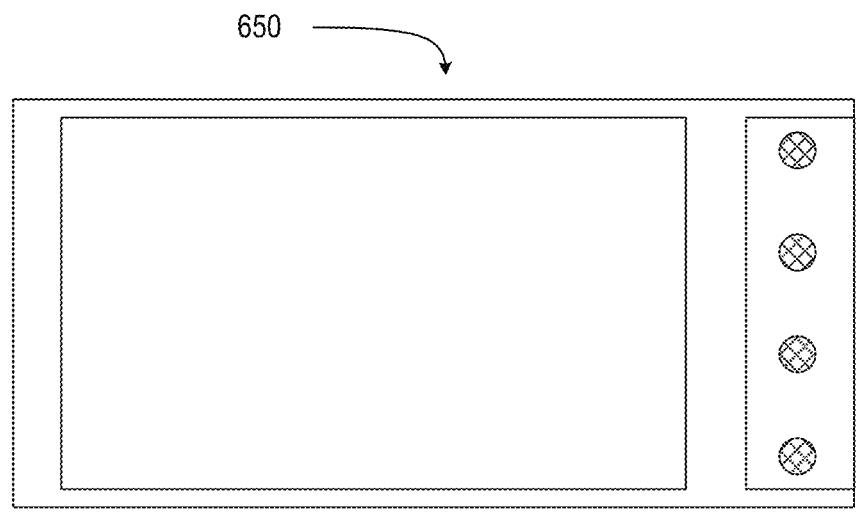
Figure 6:
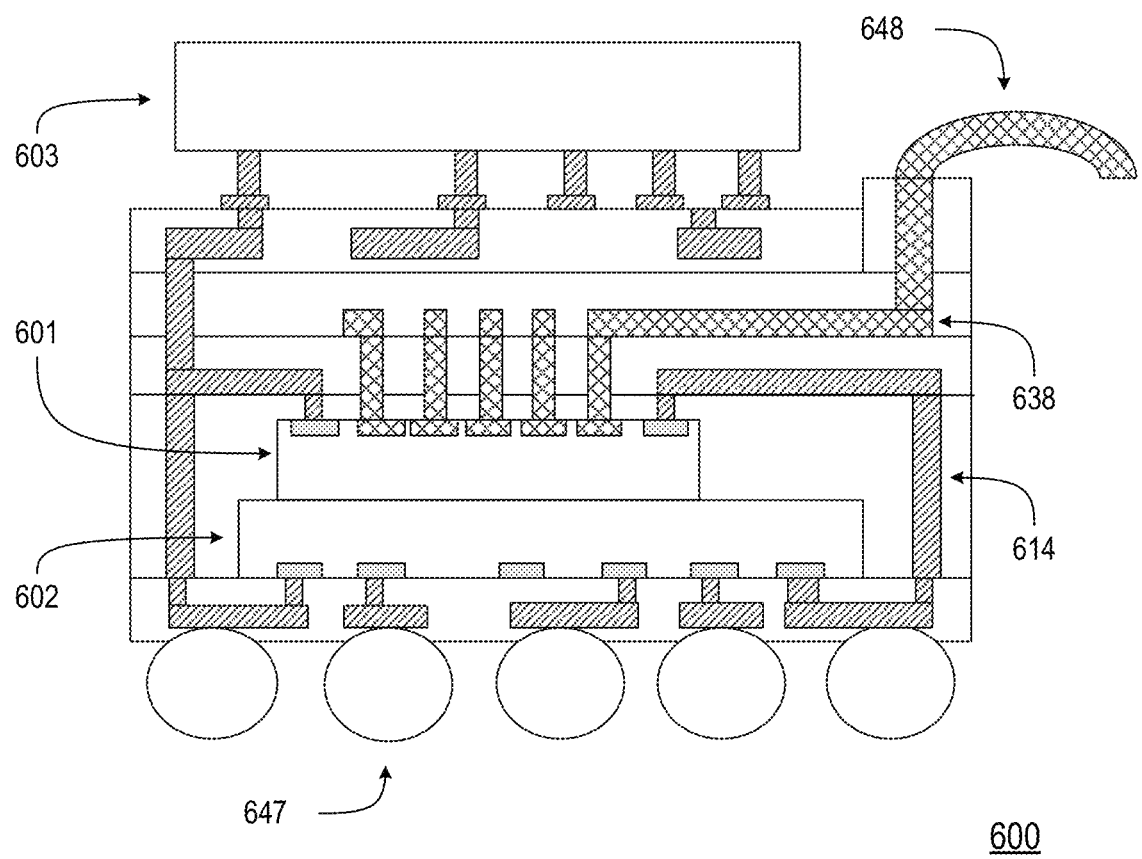

FIGS. 5 and 6 illustrate cross-sectional views of packages integrating packaged components with oRDL features, and plan views of the packages, in accordance with some embodiments. In FIG. 5, package 500 comprises a packaged component 501 with oRDL features and eRDL features, a bottom die 502, one or more solder connections 547, and one or more optical fibers 548. Optical fibers 548 are coupled to various optical contact areas on a top surface 550 of package 500.

Packaged component 501 is an IC chip having a patterned surface and a back surface opposite the patterned surface. Similarly, bottom die 502 has a patterned surface and a back surface opposite the patterned surface. As depicted, the back surface of packaged component 501 is disposed adjacent to the back surface of bottom die 502. Solder connections 547 are disposed adjacent to the patterned surface of the bottom die The patterned surface of packaged component 501 has one or more optical contact areas and one or more electrical contact areas, and the patterned surface of bottom die 502 has one or more electrical contact areas. Package 500 comprises one or more optically-transmissive features 538, which may include oRDL features in some embodiments, and which optically couples the oRDL features of packaged component 501 to optical fibers 548. Package 500 also comprises one or more electrically conductive features 514, which may include eRDL features in some embodiments, and which electrically couples the eRDL features of packaged component 501 to the electrical contact areas of the bottom die, to solder connections 547, or to both.

Packaged component 501 may comprise an optical converter, which may receive optical signals through optical fibers 548, then lead electrical signals to bottom die 502, and/or to solder connections 547.

In FIG. 6, package 600 comprises a packaged component 601 with oRDL features and eRDL features, a bottom die 602, one or more solder connections 647, and one or more optical fibers 648. In some embodiments, optical fibers 648 are coupled at various optical contact areas to a top surface 650 of package 600. In comparison with package 500, package 600 also comprises a top die 603.

Packaged component 601 is an IC chip having a patterned surface and a back surface opposite the patterned surface. Similarly, bottom die 602 has a patterned surface and a back surface opposite the patterned surface. The back surface of packaged component 601 is disposed adjacent to the back surface of bottom die 602, and solder connections 647 is disposed adjacent to the patterned surface of the bottom die. Top die 603 has one or more electrically conductive features (which includes eRDL features) protruding from an inward-facing surface, e.g., a surface facing toward the bulk of package 600.

The patterned surface of packaged component 601 has one or more optical contact areas and one or more electrical contact areas, and the patterned surface of bottom die 602 has one or more electrical contact areas. Meanwhile, package 600 comprises one or more optically-transmissive features 638, which may include oRDL features in some embodiments, and which optically couple the oRDL features of packaged component 601 to optical fibers 648. Package 600 also comprises one or more electrically conductive features 614, which may include eRDL features in some embodiments, and which electrically couple the eRDL features of packaged component 601 to one or more of the electrical contact areas of the bottom die, solder connections 647, and the electrically conductive features of top die 603.

Packaged component 601 may comprise an optical converter, which may receive optical signals through optical fibers 648, then lead electrical signals to one or more of bottom die 602, solder connections 647, and top die 603.

FIGS. 4 through 6 accordingly depict packaged components having oRDL features, incorporated in various ways within various packages. In various embodiments, a monolithic packaged component having one or more oRDL features (such as packaged component 200 or packaged component 300) may be incorporated in a package, along with one or more optically-transmissive fibers coupled to the oRDL features.

Based upon the methods discussed herein, oRDL features may be integrated within packages in a variety of ways. oRDL features may be placed on a top side (or a front side) of a package, or on a bottom side (or a back side) of a package. In various embodiments, multiple layers of oRDL features and/or eRDL features may be integrated in an IC chip. oRDL features may be integrated in a variety of package configurations, including ball grid array BGA configurations, embedded wafer-level BGA configurations, wafer-level chip scale packaging configurations, flip chip configurations, and panel-level fan-out package configurations. oRDL features may also be integrated in a molded interconnect substrate.

Figure 7:
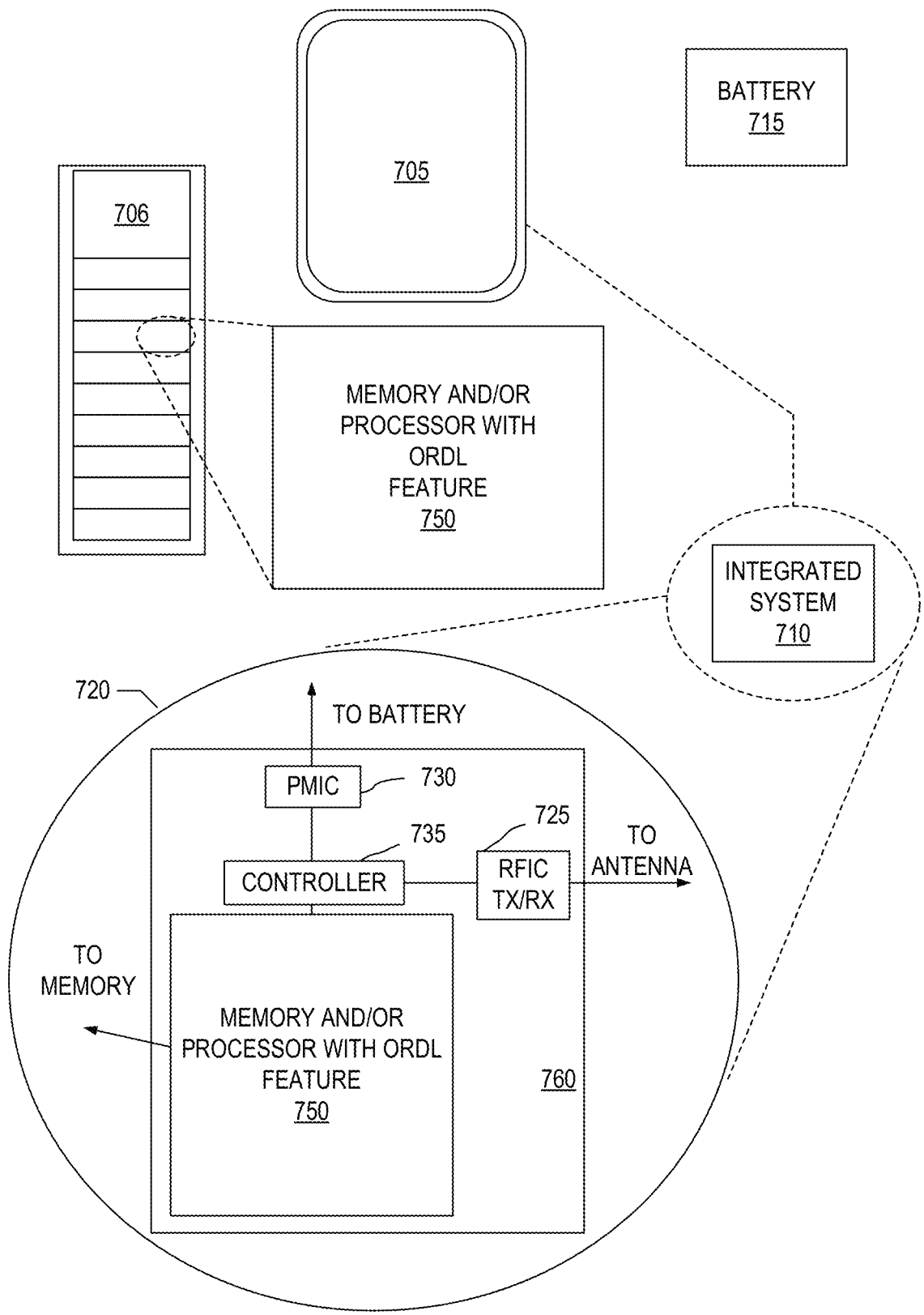
FIG. 7 illustrates a mobile computing platform and a data server machine employing a package including an optical RDL feature, in accordance with some embodiments.

FIG. 7 illustrates a mobile computing platform and a data server machine employing a package including an oRDL feature, in accordance with some embodiments. The server machine 706 may be any commercial server, for example including any number of high-performance computing platforms disposed within a rack and networked together for electronic data processing, which in the exemplary embodiment includes a packaged monolithic SoC 750. The mobile computing platform 705 may be any portable device configured for electronic data display, for electronic data processing, for wireless electronic data transmission, or the like. For example, the mobile computing platform 705 may be any of a tablet, a smart phone, a laptop computer, etc., and may include a display screen (e.g., a capacitive, inductive, resistive, or optical touchscreen), a chip-level or package-level integrated system 710, and a battery 715.

Either disposed within the integrated system 710 illustrated in the expanded view 720, or as a stand-alone packaged chip within the server machine 706, monolithic SoC 750 includes a memory block (e.g., RAM) and a processor block (e.g., a microprocessor, a multi-core microprocessor, graphics processor, or the like). The packaged chip includes an oRDL feature, for example as described elsewhere herein. The monolithic SoC 750 may be further coupled to a board, a substrate, or an interposer 760 along with one or more of a power management integrated circuit (PMIC) 730, an RF (wireless) integrated circuit (RFIC) 725 including a wideband RF (wireless) transmitter and/or receiver (TX/RX) (e.g., including a digital baseband and an analog front end module further comprises a power amplifier on a transmit path and a low noise amplifier on a receive path), and a controller 735.

Functionally, PMIC 730 may perform battery power regulation, DC-to-DC conversion, etc., and so has an input coupled to battery 715 and with an output providing a current supply to other functional modules. As further illustrated, in the exemplary embodiment, RFIC 725 has an output coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 4G, and beyond. In alternative implementations, each of these board-level modules may be integrated onto separate ICs or integrated into monolithic SoC 750.

Figure 8:
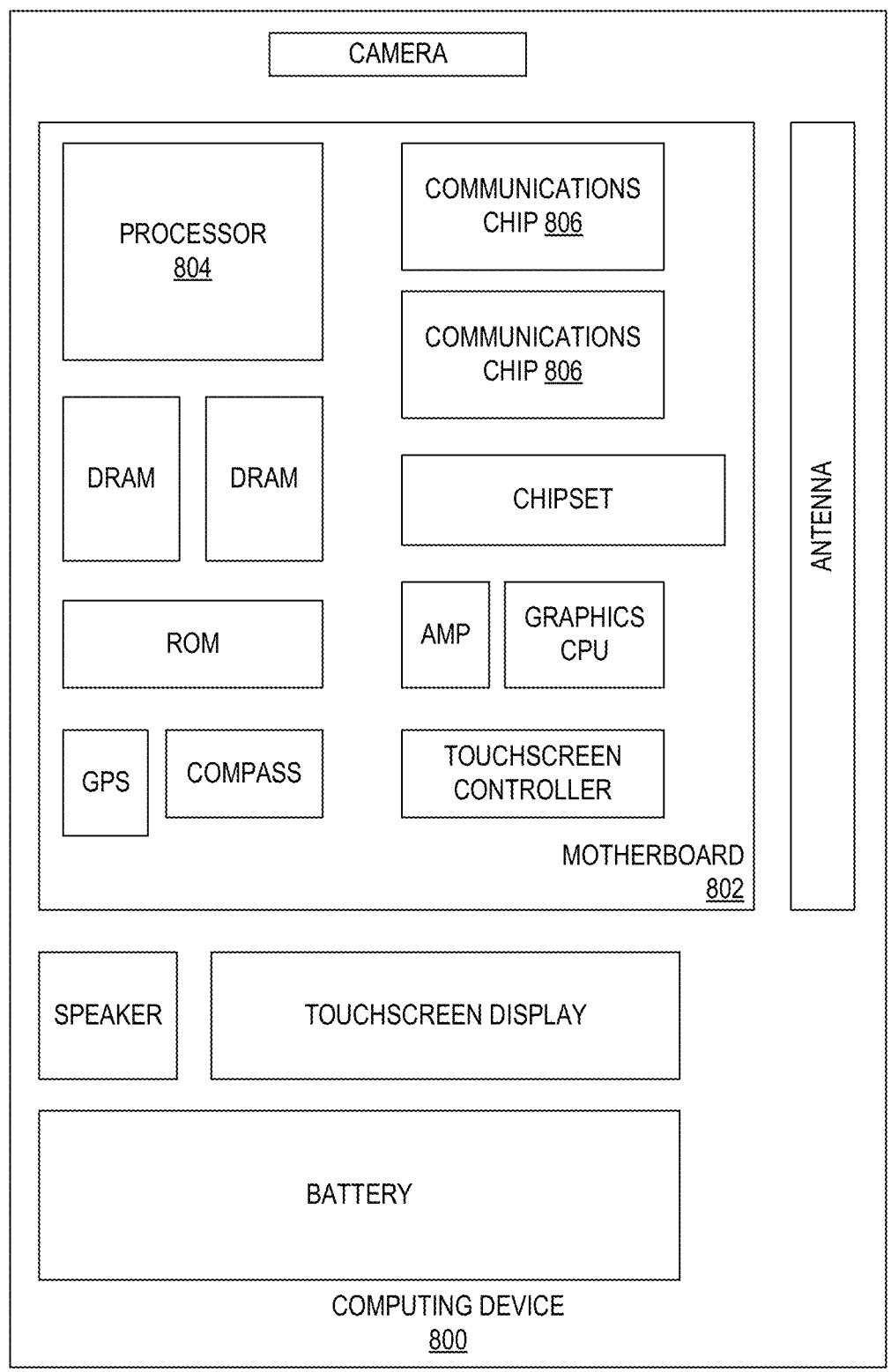
FIG. 8 is a functional block diagram of an electronic computing device, in accordance with some embodiments.

FIG. 8 is a functional block diagram of an electronic computing device, in accordance with some embodiments. Computing device 800 may be found inside platform 705 or server machine 706, for example. Device 800 further includes a motherboard 802 hosting a number of components, such as, but not limited to, a processor 804 (e.g., an applications processor), which may be in a package coupled to motherboard 802 by BGA connections of differing height (volume), for example as described elsewhere herein. Processor 804 may be physically and/or electrically coupled to motherboard 802. In some examples, processor 804 includes an integrated circuit die packaged within the processor 804 and connections between the IC die and the processor 804 are further by BGA solder connections of differing heights, for example as described elsewhere herein. In general, the term "processor" or "microprocessor" may refer to any device or portion of a device that processes electronic data from registers and/or memory to transform that electronic data into other electronic data that may be further stored in registers and/or memory.

In various examples, one or more communication chips 806 may also be physically and/or electrically coupled to the motherboard 802. In further implementations, communication chips 806 may be part of processor 804. Depending on its applications, computing device 800 may include other components that may or may not be physically and electrically coupled to motherboard 802. These other components include, but are not limited to, volatile memory (e.g., DRAM), non-volatile memory (e.g., ROM), flash memory, a graphics processor, a digital signal processor, a crypto processor, a chipset, an antenna, touchscreen display, touchscreen controller, battery, audio codec, video codec, power amplifier, global positioning system (GPS) device, compass, accelerometer, gyroscope, speaker, camera, and mass storage device (such as hard disk drive, solid-state drive (SSD), compact disk (CD), digital versatile disk (DVD), and so forth), or the like. Any of these other components may also be coupled to motherboard 802 by BGA solder connections of differing heights, for example as described elsewhere herein.

Communication chips 806 may enable wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chips 806 may implement any of a number of wireless standards or protocols, including but not limited to those described elsewhere herein. As discussed, computing device 800 may include a plurality of communication chips 806. For example, a first communication chip may be dedicated to shorter-range wireless communications, such as Wi-Fi and Bluetooth, and a second communication chip may be dedicated to longer-range wireless communications such as GPS, EDGE, GPRS, CDMA, WiMAX, LTE, Ev-DO, and others.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

An example provides a package comprising: a substrate having a patterned surface with an optical contact area; an optical redistribution layer (oRDL) feature; a liner sheathing the oRDL feature; and a build-up material extending over the patterned surface of the substrate and around portions of the oRDL feature.

Some embodiments provide a package, wherein the optical contact area is in direct contact with the oRDL feature. Some embodiments provide a package, wherein the oRDL feature extends from the optical contact area to an opening in an outer surface of the build-up material. Some embodiments provide a package, wherein the liner comprises one of: an electrically conductive material, and a material having a refractive index below that of a refractive index of the oRDL feature. Some embodiments provide a package, wherein the liner comprises at least one of: aluminum, a copper, titanium, and titanium material. Some embodiments provide a package, wherein the oRDL feature comprises an optically-transmissive material. Some embodiments provide a package, wherein the optically-transmissive material comprises polymethyl methacrylate. Some embodiments provide a package, wherein the oRDL feature extend through the openings in an outer surface of the build-up material and forms a post extending outward from the outer surface. Some embodiments provide a package, comprising an electrical redistribution layer (eRDL) feature, wherein the patterned surface of the substrate has an electrical contact area, wherein the build-up material extends around portions of the eRDL feature, and wherein the eRDL feature extends from the electrical contact area to an additional opening in the build-up material.

Some embodiments provide a package, comprising a solder connection disposed adjacent to the additional opening in the build-up material, the solder connection being electrically coupled to the eRDL feature. Some embodiments provide a package, wherein the oRDL feature extends through the opening in the build-up material and forms a post extending outward a first distance from an outer surface of the build-up material, and wherein the solder connection extends outward a second distance from the outer surface of the build-up material, the second distance being substantially equal to the first distance. Some embodiments provide a package, comprising a region between the patterned surface of the substrate and an outer surface of the build-up material in which the oRDL feature and the eRDL feature overlap. Some embodiments provide a package, comprising: a bottom die having a patterned surface with an electrical contact area and a back surface opposite the patterned surface; a solder connection; and an optical fiber, wherein the substrate has a back surface opposite the patterned surface; wherein the back surface of the substrate is disposed adjacent to the back surface of the bottom die; wherein the solder connection is disposed adjacent to the patterned surface of the bottom die, and is electrically coupled to the electrical contact area of the bottom die; and wherein the optical fiber is optically coupled to the oRDL feature.

An example provides a system comprising a memory, a processor coupled to the memory, and a wireless interface for allowing the processor to communicate with another device, the system including a package as provided above.

An example provides a monolithic packaged component, comprising: a substrate having a patterned surface with one or more electrical contact areas and one or more optical contact areas; one or more electrical redistribution layer (eRDL) features; one or more optically-transmissive optical redistribution layer (oRDL) features; and a build-up layer extending over the patterned surface of the substrate, around portions of the eRDL features, and around portions of the oRDL features, wherein the build-up layer has an outer surface with one or more first apertures and one or more second apertures; wherein the eRDL features extend from the electrical contact areas to the first apertures; wherein the oRDL features extend from the optical contact areas to the second apertures; and wherein the oRDL features comprise an optically transmissive material.

Some embodiments provide a monolithic package component, comprising one or more regions between the patterned surface of the substrate and the outer surface of the build-up layer in which the eRDL features and the oRDL features overlap. Some embodiments provide a monolithic package component, wherein the oRDL features are sheathed along their lengths with reflective liners. Some embodiments provide a monolithic package component, wherein the liners comprise a metal material. Some embodiments provide a monolithic package component, wherein the liners are in direct contact with the oRDL features. Some embodiments provide a monolithic package component, wherein the metal material comprises at least one of: aluminum, copper, titanium, and titanium nitride.

Some embodiments provide a monolithic package component, wherein the oRDL features extend through the second apertures and form posts extending outward from the outer surface of the build-up layer. Some embodiments provide a monolithic package component, comprising one or more solder connections disposed adjacent to the first apertures, wherein the solder connections are electrically coupled to the eRDL features. Some embodiments provide a monolithic package component, wherein the posts extend outward a first distance from the outer surface of the build-up layer, and wherein the solder connections extend outward a second distance from the outer surface of the build-up layer, the second distance being substantially equal to the first distance. Some embodiments provide a monolithic package component, wherein the oRDL features form posts extending outward from the outer surface of the build-up layer, and wherein the oRDL features are sheathed along their lengths with a reflective liner. Some embodiments provide a monolithic package component, wherein a material of the oRDL features comprises polymethyl methacrylate.

An example provides a package comprising: the monolithic packaged component as provided above; and one or more optically-transmissive fibers, wherein the optical fibers are optically coupled to the oRDL feature.

Some embodiments provide a package, comprising: a bottom die having a patterned surface with one or more electrical contact areas and a back surface opposite the patterned surface; and one or more solder connections, wherein the monolithic packaged component has a back surface opposite the patterned surface of the substrate; wherein the back surface of the monolithic packaged component is disposed adjacent to the back surface of the bottom die; wherein the solder connections are disposed adjacent to the patterned surface of the bottom die; and wherein the solder connections are electrically coupled to at least one of: the electrical contact areas of the bottom die, and the eRDL features of the monolithic packaged component.

Some embodiments provide a package, comprising: a top die having a patterned surface with one or more electrical contact areas; a bottom die having a patterned surface with one or more electrical contact areas and a back surface opposite the patterned surface; and one or more solder connections, wherein the monolithic packaged component has a back surface opposite the patterned surface of the substrate; wherein the back surface of the monolithic packaged component is disposed adjacent to the back surface of the bottom die; and wherein the solder connections are disposed adjacent to the patterned surface of the bottom die; and wherein the solder connections are electrically coupled to at least one of: the electrical contact areas of the bottom die, the eRDL features of the monolithic packaged component, and the electrical contact areas of the top die.

Some embodiments provide a package comprising: the monolithic packaged component as provided above; and a printed circuit board (PCB) including one or more electrical contact areas and one or more optical contact areas, wherein the solder connections of the monolithic packaged component are electrically coupled to the electrical contact areas of the PCB; and the oRDL features of the monolithic packaged component are optically coupled to the optical contact areas of the PCB.

An example provides a system comprising a memory, a processor coupled to the memory, and a wireless interface for allowing the processor to communicate with another device, the system including the apparatus as provided above.

An example provides a method of fabricating a packaged component, the method comprising: receiving a substrate having a patterned surface with one or more optical contact areas; depositing a build-up layer over the substrate; patterning the build-up layer to at least partially expose the optical contact areas; depositing an optical redistribution layer (oRDL) above the build-up layer and the exposed optical contact areas; and polishing the oRDL to expose the build-up layer, wherein the polished oRDL is planar with the exposed build-up layer.

Some embodiments provide a method, wherein the oRDL layer comprises polymethyl methacrylate.

Some embodiments provide a method, wherein the build-up layer is a first build-up layer, comprising: depositing a liner layer over the first build-up layer and the exposed optical contact areas; and depositing the oRDL over the liner layer, and above the first build-up layer and the exposed optical contact areas.

Some embodiments provide a method, wherein the patterned surface of the substrate has one or more electrical contact areas, comprising: forming apertures extending completely through the exposed first build-up layer to at least partially expose the electrical contact areas.

Some embodiments provide a method, wherein the liner layer is a first liner layer, comprising: depositing a second liner layer over the polished oRDL, the exposed build-up layer, and the exposed electrical contact areas; depositing a second build-up layer over the second liner layer; patterning the second build-up layer to expose portions of the second liner layer not covering the oRDL; and removing the exposed portions of the second liner layer to expose the first build-up layer and the exposed electrical contact areas.

Some embodiments provide a method, wherein a material of the first liner layer and a material of the second liner layer comprise at least one of titanium and titanium nitride.

Some embodiments provide a method, comprising: depositing a third build-up layer over the first build-up layer, the second liner layer, and the exposed electrical contact areas; forming apertures extending completely through the third build-up layer to at least partially expose the electrical contact areas; depositing an electrical redistribution layer (eRDL) over the third build-up layer and the exposed electrical contact areas; patterning the eRDL to form one or more electrically-conductive pads and one or more eRDL features extending between the electrical contact areas and the electrically-conductive pads; depositing a solder mask over the electrically-conductive pads, the eRDL features, and the third build-up layer; forming apertures extending completely through the solder mask to at least partially expose the electrically-conductive pads; positioning one or more solder connections above the exposed electrically-conductive pads; and soldering the solder connections to electrically couple them to the exposed electrically-conductive pads.

Some embodiments provide a method, wherein the oRDL is a first oRDL, comprising: depositing a resist layer over the solder mask and the solder connections; patterning the resist layer to expose portions of the solder mask above the first oRDL; forming apertures extending completely through the resist layer, the solder mask, and the third build-up layer to expose portions of the second liner layer; depositing a third liner layer over the resist layer, over sidewalls of the apertures extending through the resist layer, the solder mask, and the third build-up layer, and over the exposed second liner layer; forming apertures extending completely through the third liner layer and the second liner layer to expose portions of the first oRDL; depositing a second oRDL over the solder mask and the exposed first oRDL; and polishing the second oRDL and portions of the third liner layer, wherein the polishing forms one or more oRDL features comprising portions of the first oRDL and portions of the second oRDL; and wherein the polishing forms one or more liners around the oRDL features comprising portions of the first liner layer, portions of the second liner layer, and portions of the third liner layer.

Some embodiments provide a method, comprising: removing the resist layer to expose the solder mask, the solder connections, and portions of the liners around the oRDL features.

An example provides machine readable storage media having machine executable instructions stored thereon that, when executed, cause one or more processors to perform a method as provided above.

An example provides machine readable storage media having machine executable instructions stored thereon that, when executed, cause one or more processors to perform an operation comprising: receive a substrate having a patterned surface with one or more optical contact areas; deposit a build-up layer over the substrate; pattern the build-up layer to at least partially expose the optical contact areas; deposit an optical redistribution layer (oRDL) above the build-up layer and the exposed optical contact areas; and polish the oRDL to expose the build-up layer, wherein the polished oRDL is planar with the exposed build-up layer.

Some embodiments provide a machine readable storage media, wherein the oRDL layer comprises polymethyl methacrylate.

Some embodiments provide a machine readable storage media, wherein the build-up layer is a first build-up layer, the operation comprising: deposit a liner layer over the first build-up layer and the exposed optical contact areas; and deposit the oRDL over the liner layer, and above the first build-up layer and the exposed optical contact areas.

Some embodiments provide a machine readable storage media, wherein the patterned surface of the substrate has one or more electrical contact areas, the operation comprising: form apertures extending completely through the exposed first build-up layer to at least partially expose the electrical contact areas.

Some embodiments provide a machine readable storage media, wherein the liner layer is a first liner layer, the operation comprising: deposit a second liner layer over the polished oRDL, the exposed build-up layer, and the exposed electrical contact areas; deposit a second build-up layer over the second liner layer; pattern the second build-up layer to expose portions of the second liner layer not covering the oRDL; and remove the exposed portions of the second liner layer to expose the first build-up layer and the exposed electrical contact areas.

Some embodiments provide a machine readable storage media, wherein a material of the first liner layer and a material of the second liner layer comprise at least one of titanium and titanium nitride.

Some embodiments provide a machine readable storage media, the operation comprising: deposit a third build-up layer over the first build-up layer, the second liner layer, and the exposed electrical contact areas; form apertures extending completely through the third build-up layer to at least partially expose the electrical contact areas; deposit an electrical redistribution layer (eRDL) over the third build-up layer and the exposed electrical contact areas; pattern the eRDL to form one or more electrically-conductive pads and one or more eRDL features extending between the electrical contact areas and the electrically-conductive pads; deposit a solder mask over the electrically-conductive pads, the eRDL features, and the third build-up layer; form apertures extending completely through the solder mask to at least partially expose the electrically-conductive pads; position one or more solder connections above the exposed electrically-conductive pads; and solder the solder connections to electrically couple them to the exposed electrically-conductive pads.

Some embodiments provide a machine readable storage media, wherein the oRDL is a first oRDL, the operation comprising: deposit a resist layer over the solder mask and the solder connections; pattern the resist layer to expose portions of the solder mask above the first oRDL; form apertures extending completely through the resist layer, the solder mask, and the third build-up layer to expose portions of the second liner layer; deposit a third liner layer over the resist layer, over sidewalls of the apertures extending through the resist layer, the solder mask, and the third build-up layer, and over the exposed second liner layer; form apertures extending completely through the third liner layer and the second liner layer to expose portions of the first oRDL; deposit a second oRDL over the solder mask and the exposed first oRDL; and polish the second oRDL and portions of the third liner layer, wherein the polishing forms one or more oRDL features comprising portions of the first oRDL and portions of the second oRDL; and wherein the polishing forms one or more liners around the oRDL features comprising portions of the first liner layer, portions of the second liner layer, and portions of the third liner layer.

Some embodiments provide a machine readable storage media, the operation comprising: remove the resist layer to expose the solder mask, the solder connections, and portions of the liners around the oRDL features.

An example provides an apparatus comprising: means for receiving a substrate having a patterned surface with one or more optical contact areas; means for depositing a build-up layer over the substrate; means for patterning the build-up layer to at least partially expose the optical contact areas; means for depositing an optical redistribution layer (oRDL) above the build-up layer and the exposed optical contact areas; and means for polishing the oRDL to expose the build-up layer, wherein the polished oRDL is planar with the exposed build-up layer.

Some embodiments provide an apparatus, wherein the oRDL layer comprises polymethyl methacrylate.

Some embodiments provide an apparatus, wherein the build-up layer is a first build-up layer, comprising: means for depositing a liner layer over the first build-up layer and the exposed optical contact areas; and means for depositing the oRDL over the liner layer, and above the first build-up layer and the exposed optical contact areas.

Some embodiments provide an apparatus, wherein the patterned surface of the substrate has one or more electrical contact areas, comprising: means for forming apertures extending completely through the exposed first build-up layer to at least partially expose the electrical contact areas.

Some embodiments provide an apparatus, wherein the liner layer is a first liner layer, comprising: means for depositing a second liner layer over the polished oRDL, the exposed build-up layer, and the exposed electrical contact areas; means for depositing a second build-up layer over the second liner layer; means for patterning the second build-up layer to expose portions of the second liner layer not covering the oRDL; and means for removing the exposed portions of the second liner layer to expose the first build-up layer and the exposed electrical contact areas.

Some embodiments provide an apparatus, wherein a material of the first liner layer and a material of the second liner layer comprise at least one of titanium and titanium nitride.

Some embodiments provide an apparatus, comprising: means for depositing a third build-up layer over the first build-up layer, the second liner layer, and the exposed electrical contact areas; means for forming apertures extending completely through the third build-up layer to at least partially expose the electrical contact areas; means for depositing an electrical redistribution layer (eRDL) over the third build-up layer and the exposed electrical contact areas; means for patterning the eRDL to form one or more electrically-conductive pads and one or more eRDL features extending between the electrical contact areas and the electrically-conductive pads; means for depositing a solder mask over the electrically-conductive pads, the eRDL features, and the third build-up layer; means for forming apertures extending completely through the solder mask to at least partially expose the electrically-conductive pads; means for positioning one or more solder connections above the exposed electrically-conductive pads; and means for soldering the solder connections to electrically couple them to the exposed electrically-conductive pads.

Some embodiments provide an apparatus, wherein the oRDL is a first oRDL, comprising: means for depositing a resist layer over the solder mask and the solder connections; means for patterning the resist layer to expose portions of the solder mask above the first oRDL; means for forming apertures extending completely through the resist layer, the solder mask, and the third build-up layer to expose portions of the second liner layer; means for depositing a third liner layer over the resist layer, over sidewalls of the apertures extending through the resist layer, the solder mask, and the third build-up layer, and over the exposed second liner layer; means for forming apertures extending completely through the third liner layer and the second liner layer to expose portions of the first oRDL; means for depositing a second oRDL over the solder mask and the exposed first oRDL; and means for polishing the second oRDL and portions of the third liner layer, wherein the polishing forms one or more oRDL features comprising portions of the first oRDL and portions of the second oRDL; and wherein the polishing forms one or more liners around the oRDL features comprising portions of the first liner layer, portions of the second liner layer, and portions of the third liner layer.

Some embodiments provide an apparatus, comprising: means for removing the resist layer to expose the solder mask, the solder connections, and portions of the liners around the oRDL features.

It will be recognized that the principles of the disclosure are not limited to the embodiments so described, but can be practiced with modification and alteration without departing from the scope of the appended claims. For example, the above embodiments may include specific combination of features.

However, the above embodiments are not limited in this regard and, in various implementations, the above embodiments may include undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A method of fabricating a packaged component, the method comprising:
   receiving a substrate comprising a patterned surface at a side of the substrate, the patterned surface comprising:
      one or more electrical contact areas each electrically coupled to a respective electrical device within the substrate; and
      one or more optical contact areas each optically coupled to a respective optical device within the substrate;
   depositing one or more build up layers over the side of the substrate;
   patterning a first build-up layer of the one or more build-up layers to at least partially expose the optical contact areas, and to at least partially expose the electrical contact areas;
   forming one or more electrical redistribution layer (eRDL) features which are each electrically coupled to the substrate via a respective one of the one or more electrical contact areas; and
   forming one or more optically-transmissive optical redistribution layer (oRDL) features which are each optically coupled to the side of the substrate via a respective one of the one or more optical contact areas, wherein the one or more build-up layers extends around portions of the one or more eRDL features, and around portions of the one or more oRDL features;
   wherein, in a region between the side of the substrate and an outer surface of the one or more build-up layers, a first eRDL feature of the one or more eRDL features and a first oRDL feature of the one or more oRDL features overlap along a direction extending outward from the side of the substrate toward the outer surface of the one or more build-up layers;
   wherein the outer surface of the one or more build-up layers has one or more first apertures and one or more second apertures;
   wherein the one or more eRDL features each extend from a respective one of the electrical contact areas to a respective one of the one or more first apertures;
   wherein the one or more oRDL features each extend from a respective one of the optical contact areas to a respective one of the one or more second apertures; and
   wherein the one or more oRDL features each comprise an optically transmissive material.

2. The method of claim 1, wherein the one or more oRDL features comprise polymethyl methacrylate.

3. The method of claim 1, wherein forming the one or more oRDL features comprises:
   depositing a liner layer over the first build-up layer and the optical contact areas; and
   depositing an oRDL material over the liner layer, and above the first build-up layer and the optical contact areas.

4. The method of claim 3, wherein the liner layer is a first liner layer, and wherein forming the one or more eRDL features further comprises:
   depositing a second liner layer over the oRDL material, the first build-up layer, and the electrical contact areas wherein a second build-up layer of the one or more build-up layers is subsequently deposited over the second liner layer;
   patterning the second build-up layer to expose portions of the second liner layer not covering the oRDL; and
   removing the portions of the second liner layer to expose the first build-up layer and the electrical contact areas.

5. The method of claim 4, wherein a material of the first liner layer and a material of the second liner layer comprise at least one of titanium and titanium nitride.

6. The method of claim 4, wherein forming the one or more eRDL features further comprises:
   depositing a third build-up layer over the first build-up layer, the second liner layer, and the electrical contact areas;
   forming the one or more first apertures extending completely through the third build-up layer to at least partially expose the electrical contact areas;
   depositing eRDL material over the third build-up layer and the electrical contact areas; and
   patterning the eRDL material to form one or more electrically-conductive pads;
the method further comprising:
   depositing a solder mask over the electrically-conductive pads, the one or more eRDL features, and the third build-up layer;
   forming apertures extending completely through the solder mask to at least partially expose the electrically-conductive pads;
   positioning one or more solder connections above the electrically-conductive pads; and
   soldering the solder connections to electrically couple them to the electrically-conductive pads.

7. The method of claim 6, wherein the oRDL comprises a second oRDL feature, the method further comprising:
   depositing a resist layer over the solder mask and the solder connections;
   patterning the resist layer to expose portions of the solder mask above the first second oRDL feature;
   forming apertures extending completely through the resist layer, the solder mask, and the third build-up layer to expose portions of the second liner layer;
   depositing a third liner layer over the resist layer, over sidewalls of the apertures extending through the resist layer, the solder mask, and the third build-up layer, and over the second liner layer;
   forming apertures extending completely through the third liner layer and the second liner layer to expose portions of the second oRDL feature;
   depositing a third oRDL feature over the solder mask and the second oRDL feature; and
   polishing the third oRDL feature and portions of the third liner layer,
   wherein the polishing forms one or more structures comprising portions of the second oRDL feature and portions of the third oRDL feature; and
   wherein the polishing forms one or more liners around the structures comprising portions of the first liner layer, portions of the second liner layer, and portions of the third liner layer.

8. The method of claim 7, wherein, in a build-up region comprising the first build-up layer, the second build-up layer and the third build-up layer, the first eRDL feature and the first oRDL feature overlap along the direction extending outward from the patterned surface of the substrate.

* * * * *